United States Patent [19]
Fedele

[11] Patent Number: 5,601,942
[45] Date of Patent: *Feb. 11, 1997

[54] PORTABLE BATTERY PACK APPARATUS AND METHOD OF FABRICATION THEREOF

[75] Inventor: Vincent Fedele, Stow, Mass.

[73] Assignee: VST Technologies, Inc., Concord, Mass.

[*] Notice: The term of this patent shall not extend beyond the expiration date of Pat. No. 5,436,089.

[21] Appl. No.: 385,286

[22] Filed: Feb. 8, 1995

Related U.S. Application Data

[63] Continuation-in-part of Ser. No. 114,768, Aug. 31, 1993, Pat. No. 5,436,089.

[51] Int. Cl.$^6$ ............................................................ H01N 2/24
[52] U.S. Cl. .......................... 429/159; 429/162; 29/623.4
[58] Field of Search ................................. 429/156, 159, 429/162; 29/623.4

[56] References Cited

U.S. PATENT DOCUMENTS

| | | | |
|---|---|---|---|
| 1,501,084 | 7/1924 | Wright et al. | 429/156 |
| 1,747,757 | 2/1930 | Diebel | 429/159 X |
| 4,883,726 | 11/1989 | Peled et al. | 429/156 X |
| 4,904,549 | 2/1990 | Goodwin et al. | 429/97 |
| 5,057,385 | 10/1991 | Hope et al. | 429/162 |
| 5,180,644 | 1/1993 | Bresin et al. | 429/98 |
| 5,302,110 | 4/1994 | Desai et al. | 429/159 X |
| 5,409,787 | 4/1995 | Blanter et al. | 429/159 X |
| 5,436,089 | 7/1995 | Fedele | 429/156 |

*Primary Examiner*—Stephen Kalafut

[57] ABSTRACT

A battery pack is provided for housing a plurality of flat cells for portable electronic device applications. The battery pack is sufficiently thin to preserve the desirable thin profile of the flat cells and yet exhibits surprising structural integrity considering the relatively thin polycarbonate material from which the housing and the connective sheets of the pack are fabricated. A first group of flat cells is coupled to one side of a central connective member or circuit board. A second group of flat cells is coupled to an opposite side of the central connective member. The cells of the first group are situated in side-by side relationship and the cells of the second group are situated in side-by-side relationship. An upper connective sheet is adhesively coupled to the upper surfaces of the first group of flat cells and the upper surfaces of the second group of flat cells. A lower connective sheet is adhesively coupled to the lower surfaces of the first group of flat cells and the lower surfaces of the second group of flat cells. In this manner, a substantially I beam-like structure with significant structural integrity is formed. A main housing section of plastic sheet material is then formed around this I beam-like structure. The main housing section is adhesively coupled to both the upper connective sheet and the lower connective sheet.

11 Claims, 19 Drawing Sheets

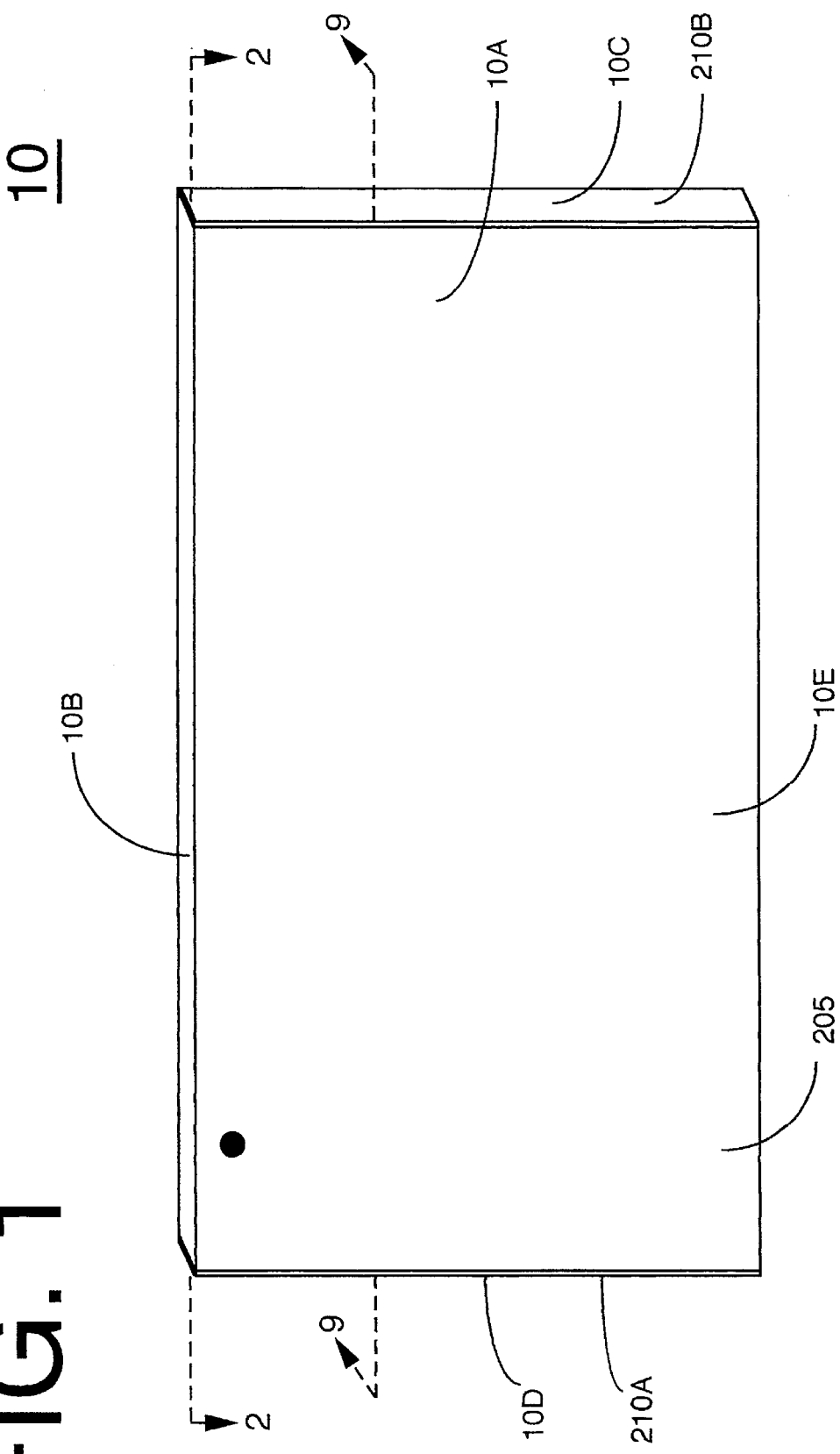

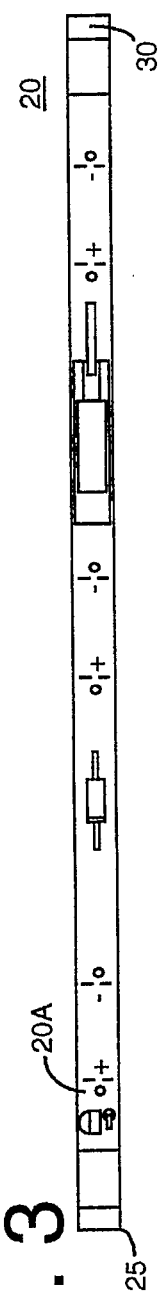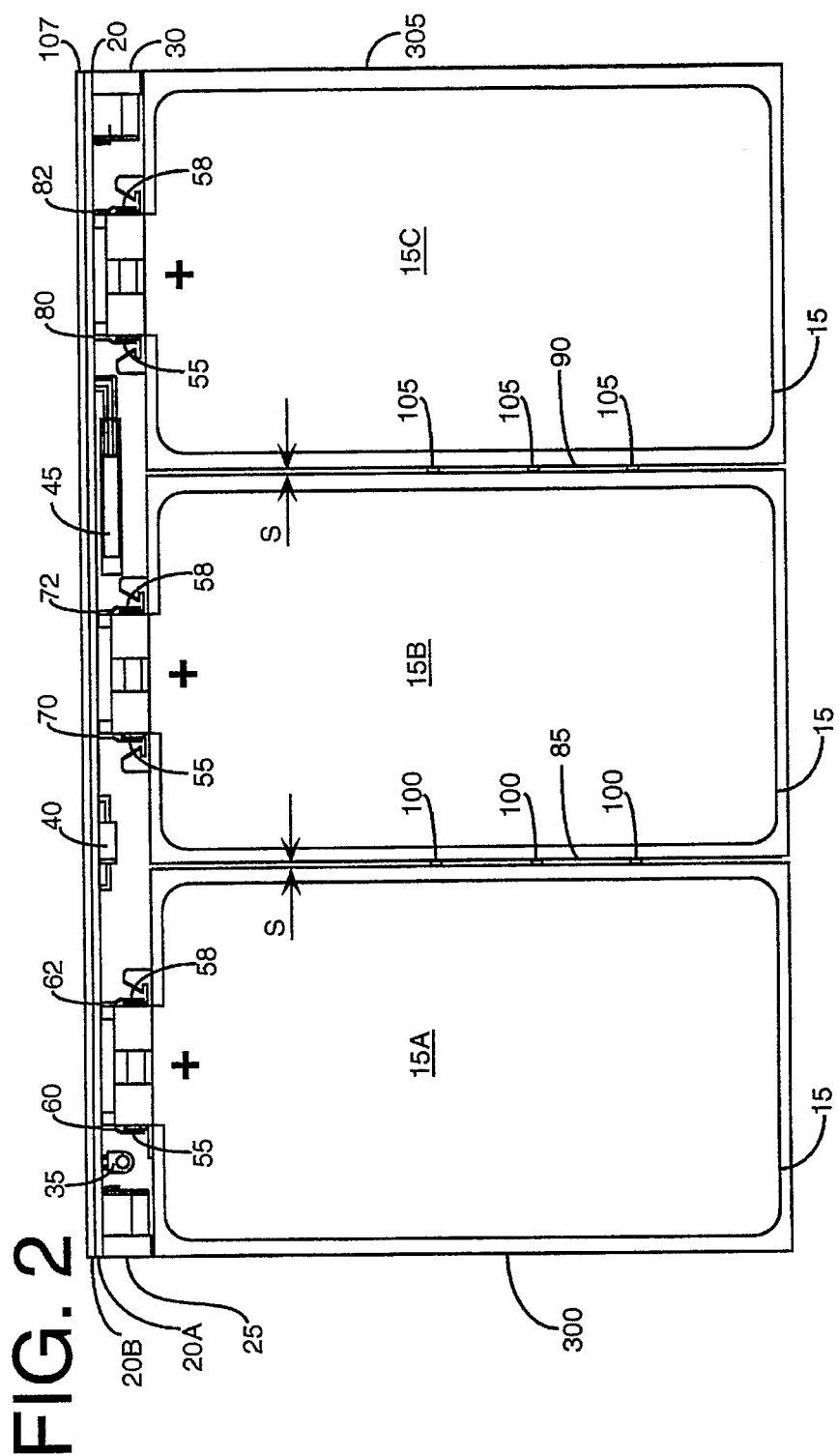

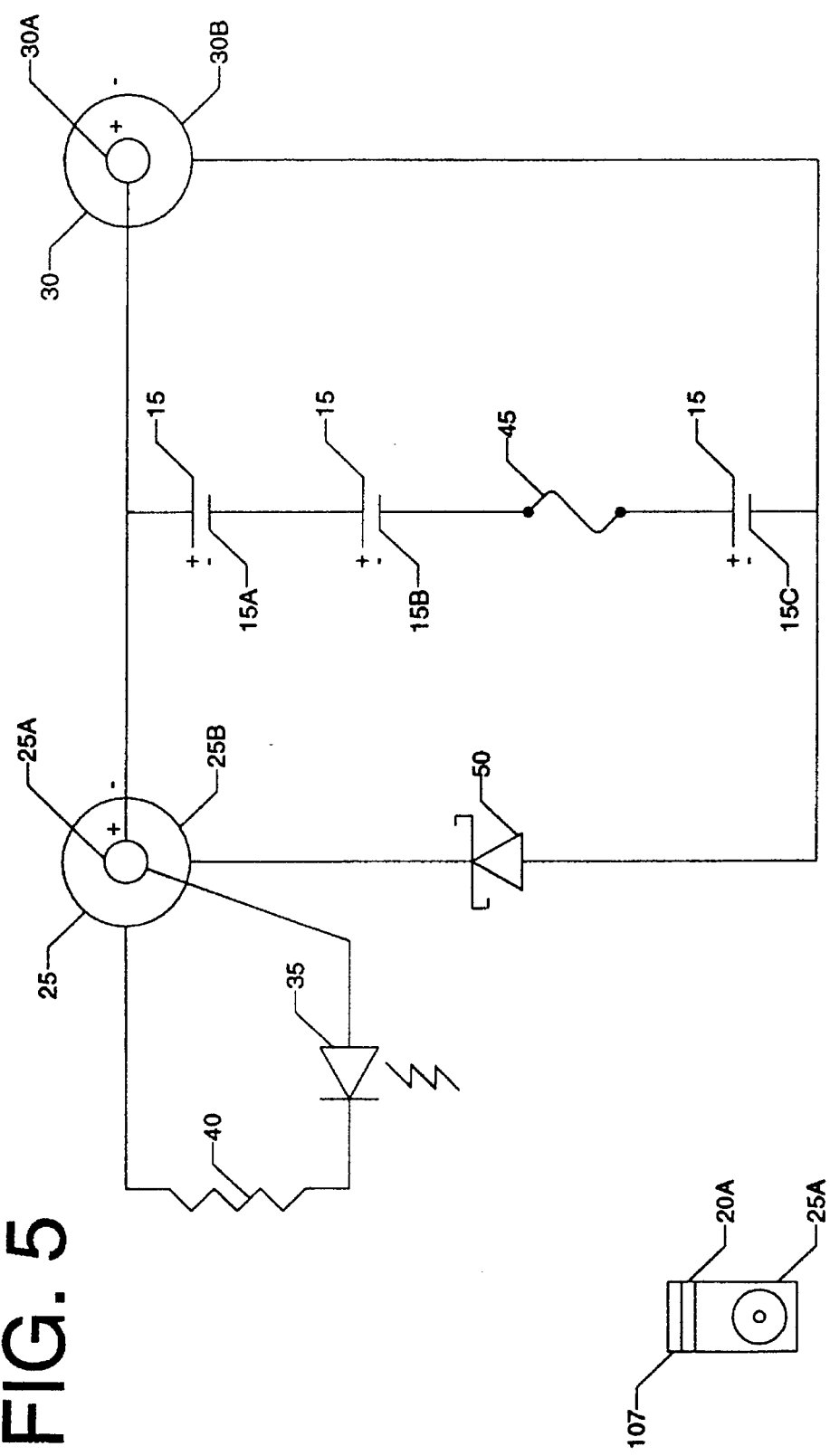

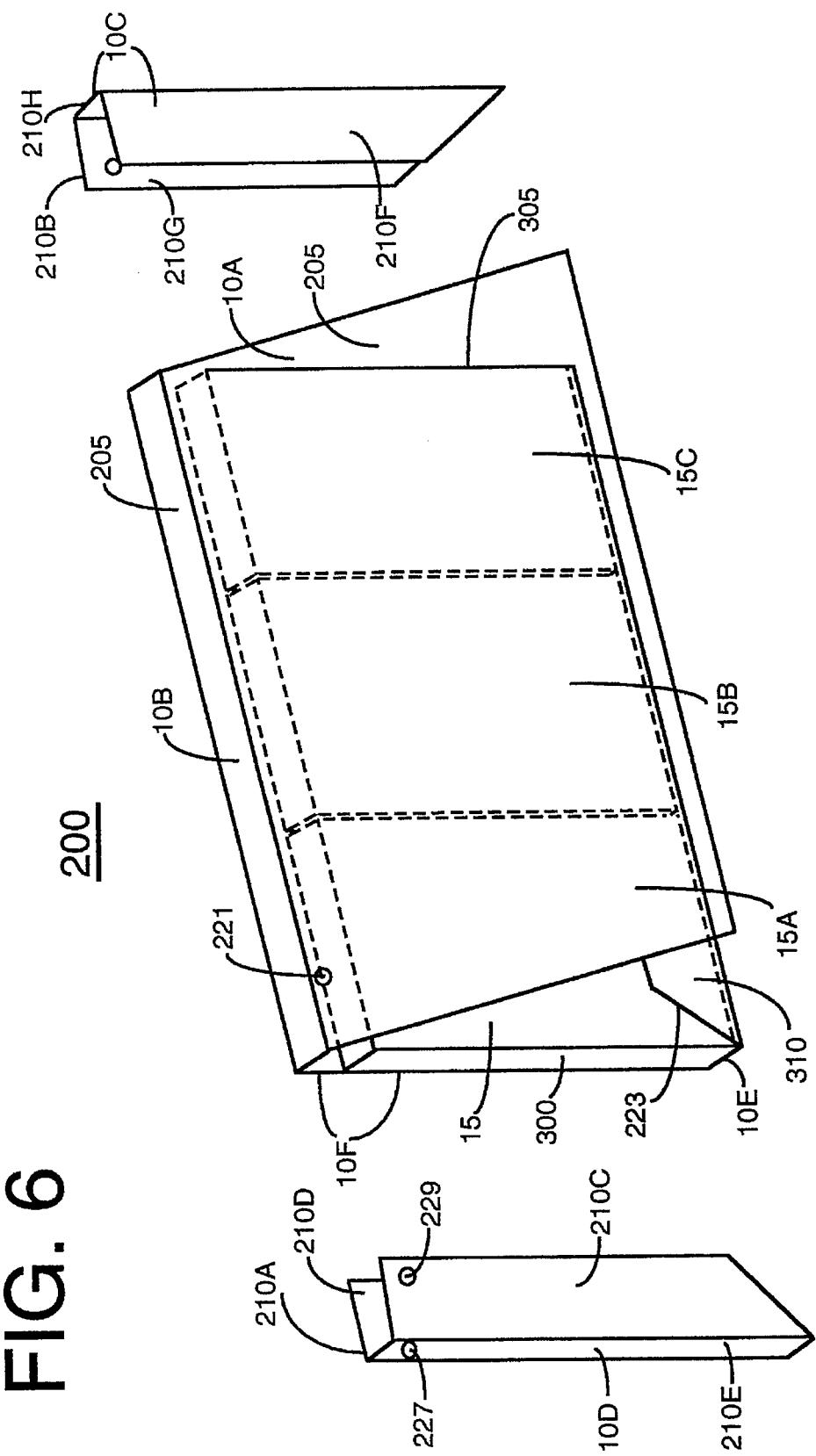

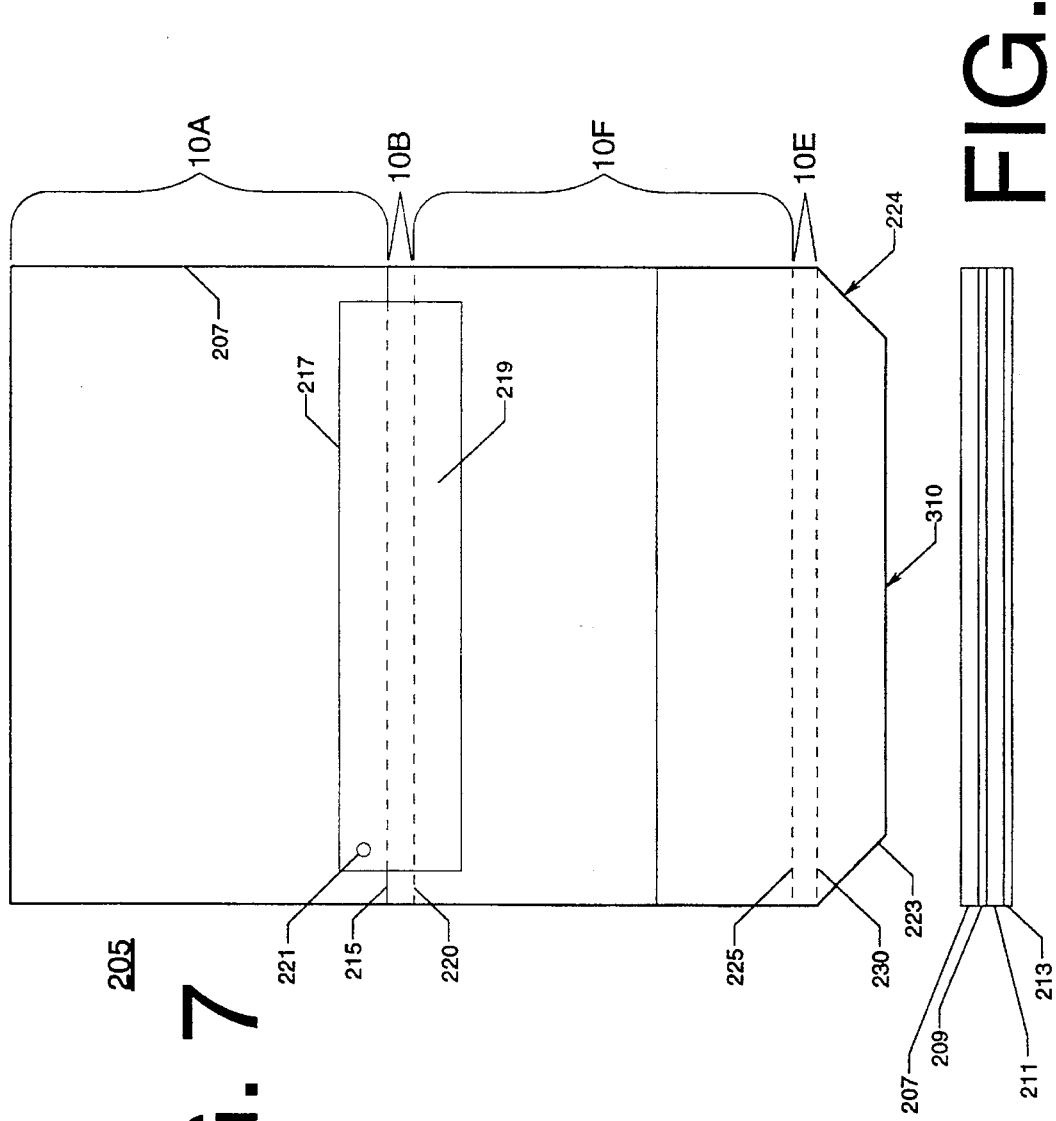

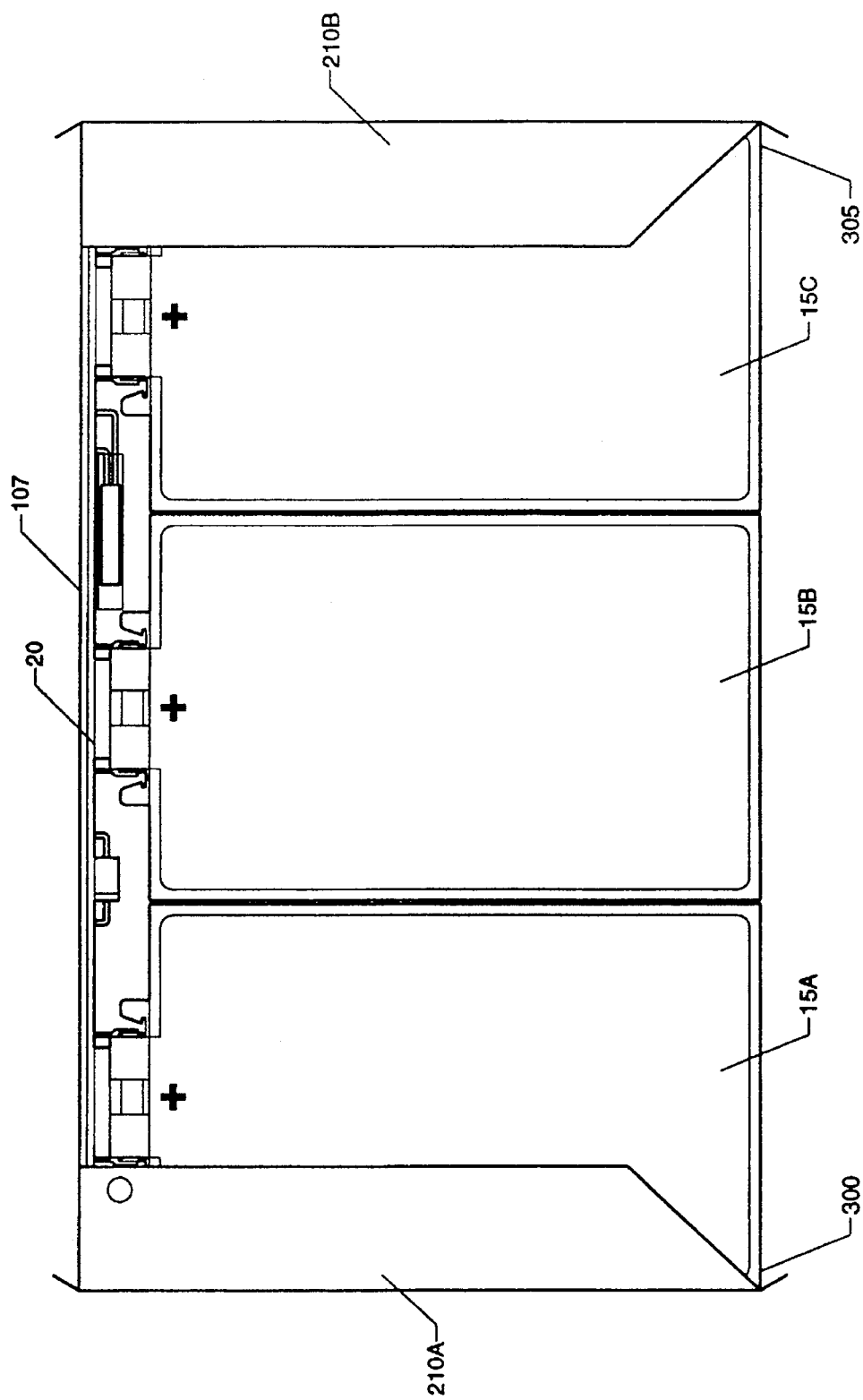

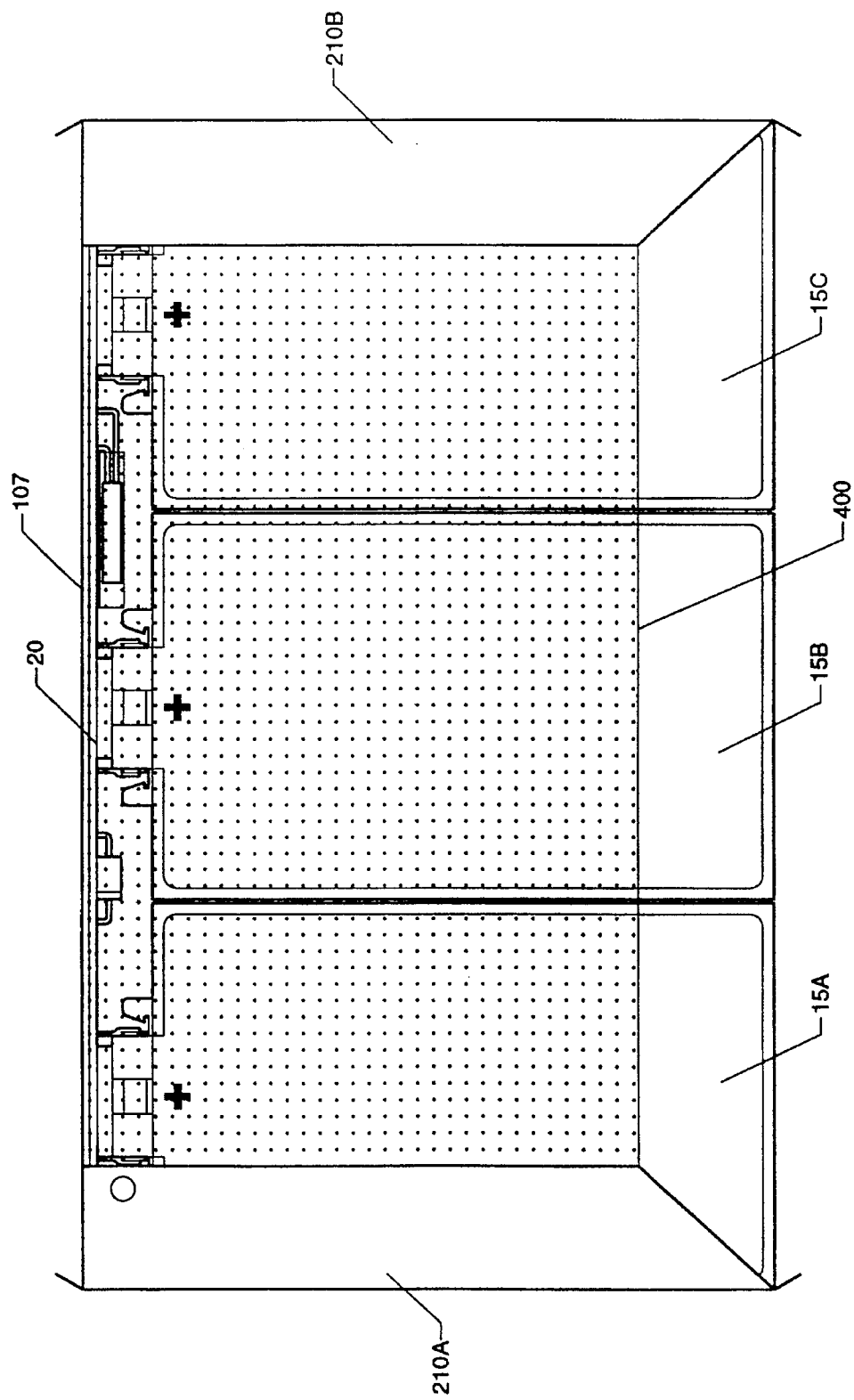

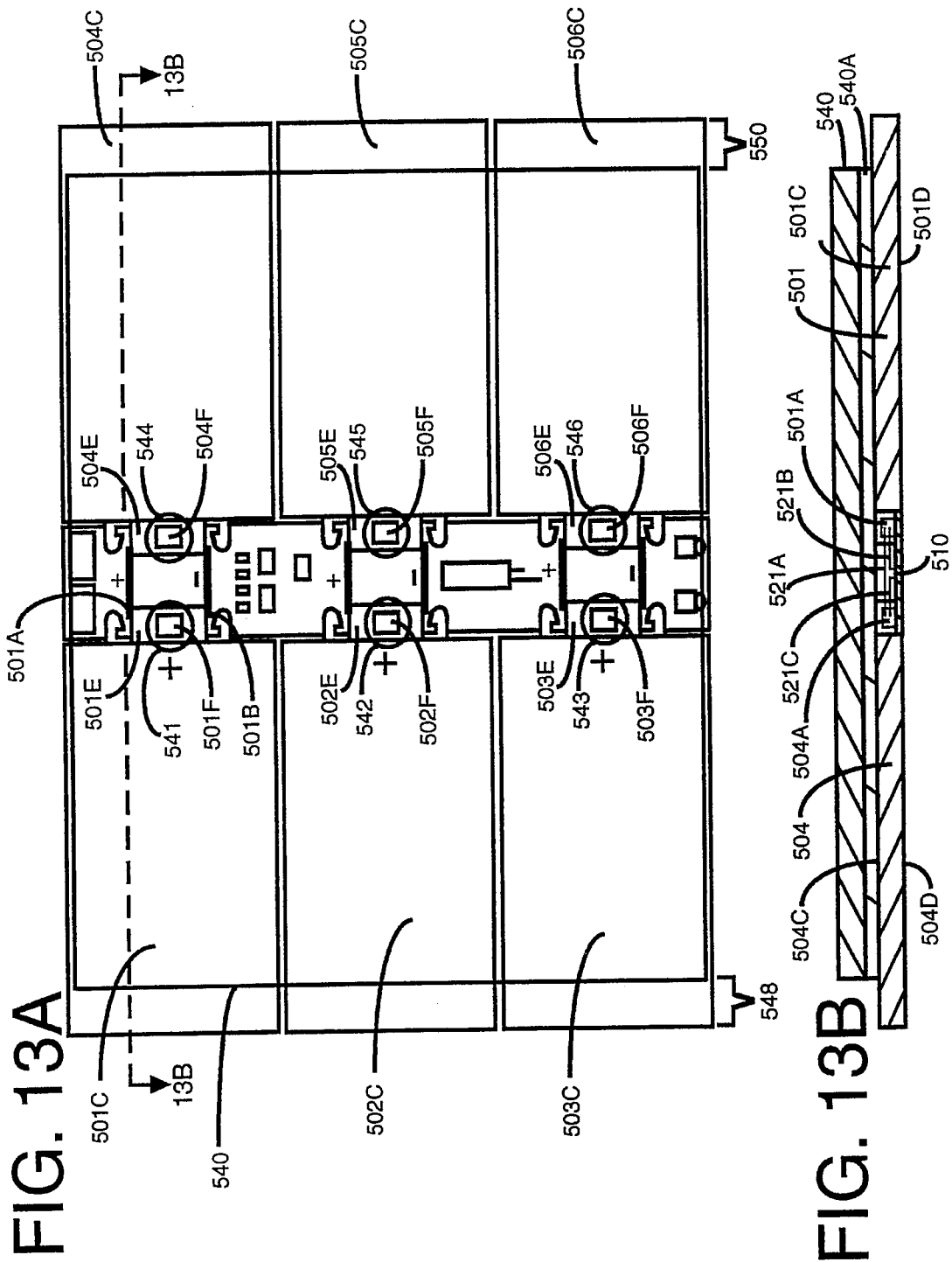

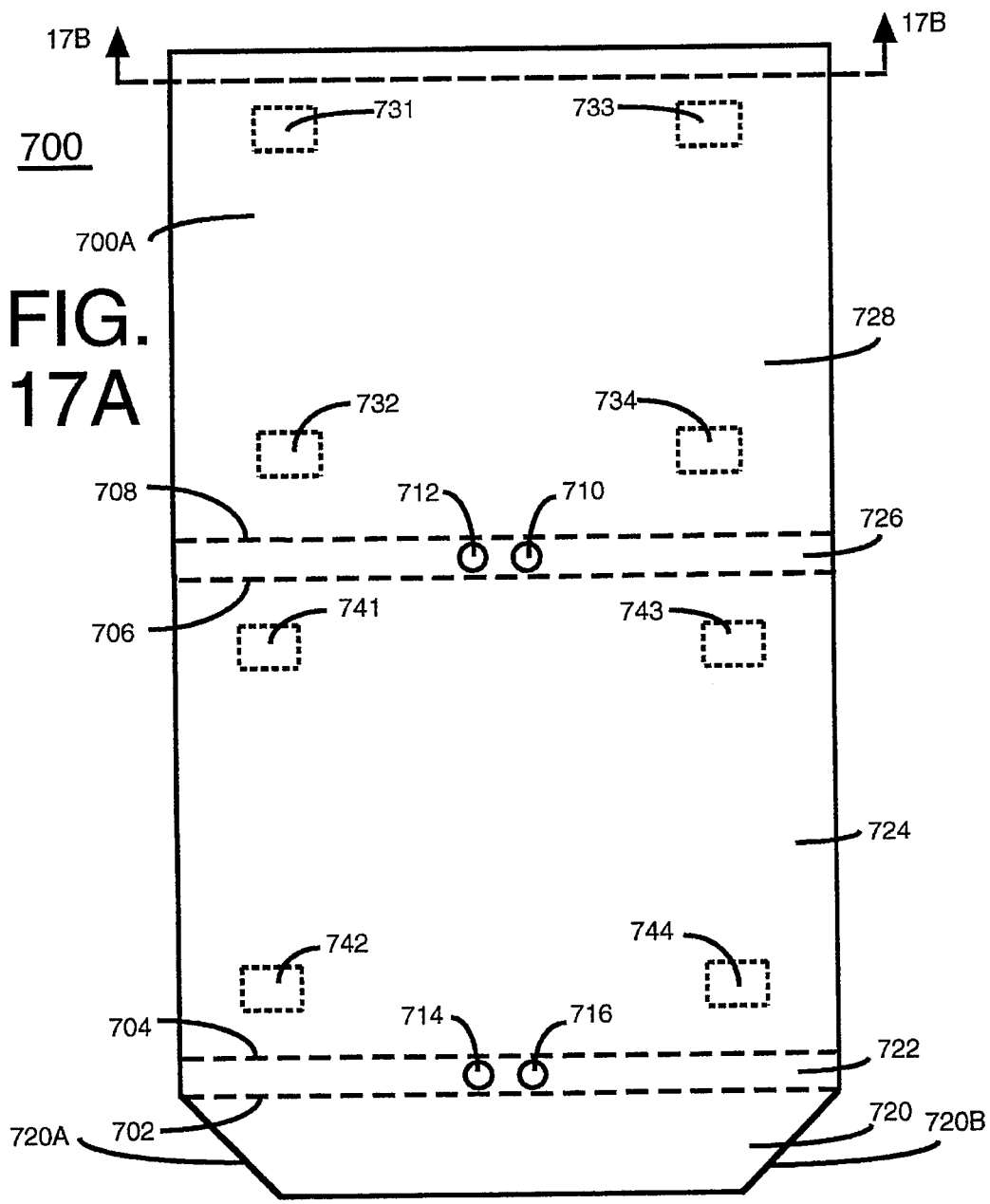
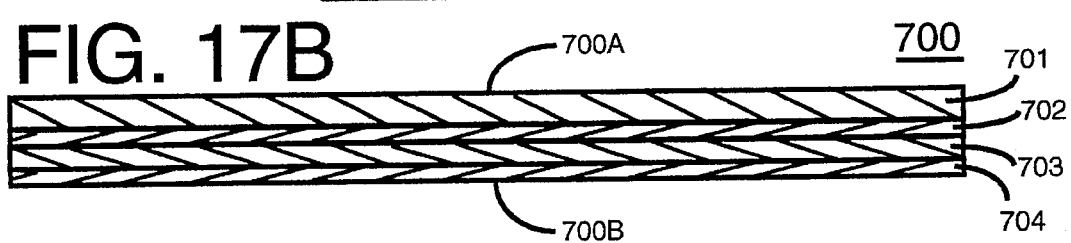

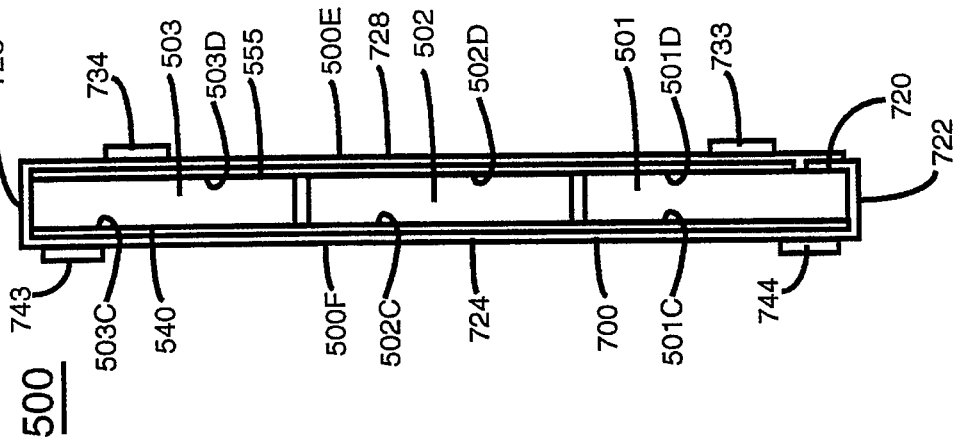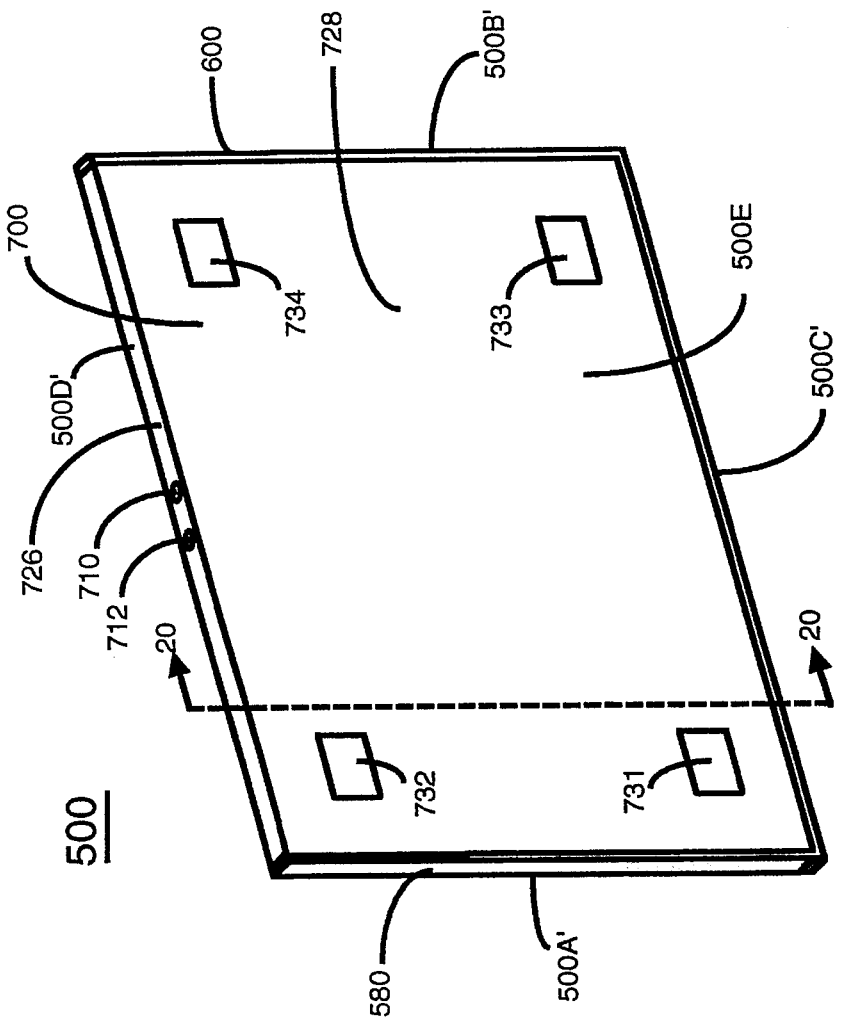

PORTABLE BATTERY PACK APPARATUS AND METHOD OF FABRICATION THEREOF

CROSS REFERENCE TO RELATED PATENT APPLICATIONS

This patent application is a continuation-in-part of the copending patent application entitled "PORTABLE BATTERY PACK APPARATUS AND METHOD OF FABRICATION THEREOF" by Vincent Fedele, Ser. No. 08/114,768, filed Aug. 31, 1993, now U.S. Pat. No. 5,436,089.

BACKGROUND OF THE INVENTION

This invention relates in general to battery housing structures, and more particularly, to battery housings and battery packs used by portable electronic devices.

Portable electronic devices, such as so-called laptop computers for example, by their nature require a portable source of power. Battery packs composed of either rechargeable or non-rechargeable cells provide such a portable source of power.

To reduce the total weight of battery packs which usually tend to be relatively heavy, it is desirable to make the housings for such battery packs of light-weight plastic materials. Although such light-weight plastic materials are desirable for battery housing applications due to their low weight, these plastic materials are also highly desirable due to their electrically insulative properties. Unfortunately however, when a battery housing fabricated from such a material is made relatively thin, the resultant battery housing often exhibits undesirably low structural integrity. Battery packs which exhibit low structural integrity are potentially dangerous and should be avoided in portable electronic applications.

Many portable battery packs are fabricated with parallelepiped (rectangular-sided) housings divided into two halves, each half being formed from relatively thick injection molded thermoplastic materials such as ABS (acrylic butyl styrene) plastic and polycarbonate. Conventional cylindroidal voltaic cells are placed inside the rectangular housing of such a battery pack. The interior plastic walls of the housing are shaped to hold the cells. With a significant portion of the volume of the battery pack being taken up by the rectangular plastic housing itself and the open spaces between the cells, the energy density of such battery packs tends to be relatively low, whereas the weight of the structure tends to be relatively high. Another disadvantage of this battery housing arrangement is that the battery pack tends to be relatively easy to break and fracture upon dropping.

As discussed above, parallelepiped or rectangular battery housings are typically adapted for housing cylindroidally-shaped voltaic cells. However, with the advent of so-called "flat cells" (battery cells which exhibit a thin rectangular profile), a high strength, low weight battery housing for such cells becomes very desirable.

SUMMARY OF THE INVENTION

Accordingly, one object of the present invention is to provide a battery pack which exhibits high structural integrity.

Another object of the present invention is to provide a battery pack including a battery housing which is fabricated of relatively thin electrically insulative material.

Yet another object of the present invention is to provide a battery pack which is relatively light in weight.

Still another object of the invention is to provide a battery pack which is adapted for housing thin cells.

In accordance with one embodiment of the present invention, a battery pack is provided for a portable electronic apparatus. The battery pack includes a connective member or circuit board having first and second opposed sides. The battery pack further includes a plurality of flat first cells situated in side-by-side relationship, each first cell having a connector end facing the first side of the connective member, each first cell having an upper and lower major surface, the upper surfaces of the first cells being aligned in a common upper plane, the lower surfaces of the first cells being aligned in a common lower plane. The battery pack further includes a plurality of flat second cells situated in side-by-side relationship, each second cell having a connector end facing the second side of the connective member, each second cell having an upper and lower major surface, the upper surfaces of the second cells being aligned in the common upper plane, the lower surfaces of the second cells being aligned in the common lower plane. The battery pack includes an upper plastic connective sheet adhesively coupled to the upper surfaces of the flat first cells and the flat second cells. The battery pack further includes a lower plastic connective sheet adhesively coupled to the lower surfaces of the flat first cells and the flat second cells thus forming a substantially multi I-beam like structure which provides structural integrity to the battery pack.

BRIEF DESCRIPTION OF THE DRAWINGS

The features of the invention believed to be novel are specifically set forth in the appended claims. However, the invention itself, both as to its structure and method of operation, may best be understood by referring to the following description and accompanying drawings.

FIG. 1 is a front perspective view of the battery pack apparatus of the present invention.

FIG. 2 is a cross section of the battery pack of FIG. 1.

FIG. 3 is an side view of the printed circuit board employed in the battery pack of the invention.

FIG. 4 is an end view of the printed circuit board employed in the battery pack of the invention.

FIG. 5 is a schematic diagram of one recharger circuit which may be employed within the battery pack of the invention.

FIG. 6 is a perspective representation of the main housing and housing end pieces of the battery pack.

FIG. 7 is a side view of a sheet of material employed to fabricate the battery housing employed in the present invention.

FIG. 8 is a side profile showing the various layers employed in the battery housing.

FIG. 10 is a front view of a multi-cell battery subassembly with end pieces mounted thereon.

FIG. 11 is a view of an adhesive covered sheet which may be employed as an alternative way of holding the cells of the battery pack in position during fabrication.

FIG. 13A is a top plan view of the battery assembly after application of an upper connective sheet.

FIG. 13B is a cross sectional view of the upper connective sheet.

FIG. 17A is a plan view of the main housing section of the battery.

FIG. 17B is a cross sectional view of the main housing section of FIG. 17A taken along section line 17B—17B.

FIG. 19 is a bottom perspective view of the completed battery.

FIG. 20 is a cross sectional view of the completed battery of FIG. 19 taken along section line 20—20.

DETAILED DESCRIPTION OF THE INVENTION

Figure 9:
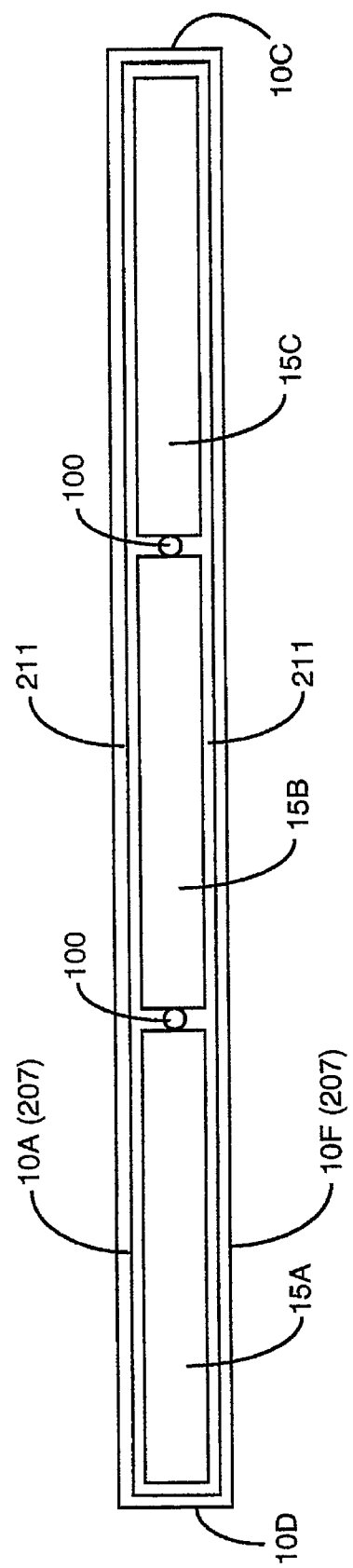
FIG. 9 is another cross section of the battery pack of FIG. 1.

FIG. 1 is a front perspective view of battery pack 10 of the present invention. Battery pack 10 exhibits a substantially parallelepiped shape with rectangular sides. In FIG. 1, front side 10A, top side 10B and right side 10C are visible. Left side 10D and bottom side 10E are partially visible. The back side 10F of battery pack 10 is not visible in this view.

FIG. 2 is a cross-sectional view of battery 10 of FIG. 1 taken along section line 2—2 to reveal the interior of battery 10. Battery 10 includes a plurality of voltaic cells 15. For example, in this particular embodiment, three cells are employed. This number of cells is only given for purposes of illustration and should not be taken as being limiting. Cells 15 are flat cells such as the THINLINE® Energy Cell manufactured by Portable Energy Products, Inc. or the Revocel™, manufactured by Hyundai Electronics Industries Co., LTD. In this particular embodiment, three 2 volt cells arranged in series are employed as cells 15 although other voltage cells could be used as well depending on the particular application. Battery 10 thus exhibits a 6 volt potential with 5.0 Ah energy storage capability.

Cells 15 are fixedly mounted to an elongated rectangular printed circuit board 20. An edge or side view of printed circuit board 20 is shown in FIG. 2. For clarity, a top view of printed circuit board 20 is included as FIG. 3. The top of board 20 is designated as top 20A and is visible in FIG. 3 The bottom of board 20 is designated as bottom 20B and although not visible in FIG. 3, board bottom 20B is the leaded side of board 20 and is shown in FIG. 2.

Board 20 includes recharging circuitry for charging cells 15. The recharging circuitry of board 20 includes a power input receptacle 25 to which a source of direct current voltage (approximately 6 volts ) is supplied for recharging cells 15. The circuitry of board 20 also includes a power output receptacle 30 to which the direct current voltage (approximately 6 volts ) produced by the recharging circuit is provided. The same type of power receptacle may be employed as receptacles 25 and 30 is shown in FIG. 3.

FIG. 4 shows an end view of circuit board 20 after being populated with receptacle 25 and other components.

One recharging circuit which may be placed on board 20 to recharge cells 15 is shown schematically in FIG. 5. As shown in FIG. 5, the recharging circuit includes a light emitting diode (LED) 35 coupled via a 330 ohm resistor 40 to input receptacle 25 to give an indication of when battery 10 is plugged into a source of DC power. As a convenience to the user, when the battery is plugged into a DC power source for charging purposes, LED 35 turns on and emits light. More particularly, the anode of LED 35 is coupled to the positive terminal 25A of receptacle 25 and the cathode of LED 35 is coupled via resistor 40 to the negative terminal 25B of receptacle 25.

The positive terminal 25A of input receptacle 25 is coupled to the positive terminal 30A of receptacle 30. For ease of discussion, the three cells 15 in battery 10 are now designated separately as cells 15A, 15B and 15C. The positive terminal of cell 15A is coupled to the negative terminal 25B of receptacle 25 and to negative terminal 30B of receptacle 30. The negative terminal of cell 15A is coupled to the positive terminal of cell 15B. The negative terminal of cell 15B is coupled via a thermal circuit breaker 45 to the positive terminal of cell 15C. Should excessive amounts of current ever be drawn from cells 15, as in the case of a short circuit external to output connector 30 or as in the case of an internal battery short circuit, then breaker 45 opens and battery current flow ceases. A low voltage drop, snapaction bimetallic strip type thermal breaker is one type of breaker which may be employed as breaker 45.

The negative terminal of cell 15C is coupled to the negative terminal of output receptacle 30. The negative terminal of cell 15C is also coupled via a Schottky diode 50 to the negative terminal 25B of input receptacle 25. Diode 50 prevents current from flowing through cells 15 should the supply of voltage to input receptacle 25 somehow be backwards, that is, reversed biased. Damage to cells 15 is thus prevented in the case of a backwards input supply voltage connection.

Battery pack 10 is fabricated in the following manner. With the exception of the mounting of cells 15 on circuit board 20, circuit board 20 is fabricated with the recharging circuit of FIG. 5 thereon using conventional printed circuit board layout, population and final assembly techniques.

It is important to the invention that cells 15 are situated in substantially uniform spaced-apart relationship as seen in FIG. 2 which is approximately to scale. In one embodiment of the invention, a spacing, S, of 0.020 inches between cells was found to be suitable, although greater or lesser amounts of spacing than this can be employed as long as the cells are relatively closely spaced. The purpose of this spacing is to allow for tolerance variations in the dimensions of the battery cells. Flat cells are typically fabricated from two halves which are ultrasonically welded together. When the weld is formed, undesired flashings often result at the side edges of the flat cells where the two halves come together. These flashings are one cause of flat cell dimensional variations.

It has been found that the spacing, S, could be reduced to zero if thin cells with perfect dimensions were employed, that is, wherein there is no lateral dimensional variation from cell to cell. Generally, the spacing S is in the range of zero to approximately 0.04 inches with the aforementioned spacing, S, of approximately 0.02 inches being employed in the preferred embodiment of the invention.

One approach which has been found to be suitable for obtaining the desired intercell spacing, S, is to arrange cells 15 in sided-by-side relationship as seen in FIG. 2. (Before discussing the approach in detail, it is first noted that cells 15 each include terminals 55 and 58 which serve as mounting terminals as well as electrical current carriers.) Circuit board 20 includes mounting holes (not visible in FIG. 2) at locations 60, 62 (for cell 15A), 70, 72 (for cell 15B) and 80, 82 (for cell 15C). The mounting holes at location 60, 62 receive mounting terminals 55, 58 respectively of cell 15A. The mounting holes at location 70, 72 receive mounting terminals 55, 58 respectively of cell 15B. The mounting holes at location 80, 82 receive mounting terminals 55, 58 respectively of cell 15C.

The mounting hole pair at locations 60, 62 is spaced with respect to the mounting hole pair at location 70, 72 so that the desired spacing, S, between cell 15A and 15B is approximately obtained when cells 15A and 15B are mounted to circuit board 20 by soldering the terminals of such cells to circuit board metal lands at their respective circuit board holes. Similarly, the mounting hole pair at location 70, 72 is spaced with respect to the mounting hole pair at location 80, 82 so that the desired spacing, S, between cell 15B and 15C is approximately obtained when cells 15B and 15C are mounted to circuit board 20 by soldering the terminals of such cells to circuit board metal lands at their respective circuit board holes.

To precisely obtain the intercell spacing, S, between cell 15A and 15B, and between 15B and 15C, a metal blade (not shown) or temporary spacer exhibiting a width, S, is situated between cell 15A and 15B at location 85. Another identical blade is situated between cell 15B and 15C at location 90 to calibrate the desired intercell spacing between those two cells.

With both blades in position, an adhesive such as Five Minute Epoxy, Devcon Part No. 14250, is applied at one or more locations 100 between cells 15A and 15B. Similarly, the same adhesive is applied at one or more locations 105 between cells 15B and 15C as shown. When the adhesive dries, cell 15A is held at the desired intercell spacing, S, with respect to cell 15B. and cell 15B as also held at the desired intercell spacing with respect to cell 15C. The blades between the cells are now removed. The completed cell subassembly thus formed is what is depicted in FIG. 2. That assembly measures approximately 5⅝ inches by 9⅜ inches in this particular embodiment.

It is noted that maintaining intercell spacing, S, helps to assure the squareness or rectangularity of the resultant battery pack. While the intercell spacing, S, is maintained at the top of cells 15 by the spacing between the mourning hole pairs in board 20 into which cells 15 are mounted, at the same time the intercell spacing, S, is temporarily maintained at the bottom cells 15 by the spacer blades therebetween. Stated alternatively, cells 15 exhibit a substantially uniform intercell spacing. In other words, the intercell spacing at the top of the cells is substantially the same as the intercell spacing at the bottom of the cells. Thus assures that cells 15 are substantially parallel with respect to each other and further assures the rectangularity of the resultant battery pack.

The subassembly of FIG. 2 is now situated within a foldable housing 200 which includes main housing 205 and a pair of housing end pieces 210A and 210B as shown in FIG. 6 which is draw approximately to a 1:2 scale. Before proceeding with a discussion of the final assembly of the subassembly of FIG. 2 into housing 200 to complete battery pack 10, a discussion of the fabrication of housing 200 will follow.

Housing 200 is fabricated from polycarbonate material which in this particular embodiment is approximately 0.015 inch thick. As seen in FIG. 6, main housing 205 is folded at a number of locations (lines) subsequently described to form the housing structure shown. Prior to this folding operation, housing 205 is formed from a sheet 207 of polycarbonate which is cut to a configuration, such as indicated in the example of FIG. 7, which when folded will substantially surround the completed cell subassembly of FIG. 2 and form a substantially box-like enclosure therefor. In this particular embodiment of the invention, sheet 207 is clear polycarbonate, although other applications are possible in which the polycarbonate is a colored sheet. When a clear polycarbonate sheet is employed as sheet 207, as in this example, various logos and text information may be stenciled onto the sheet to identify and distinguish the resultant battery structure.

As seen in FIG. 8, a number of different ink and adhesive layers are built up on sheet 207 to form main housing 205 as will now be described. An ink layer 209 (approximately 0.002 in. thick) having one or more colored portions of logo or text information is situated on polycarbonate layer 207. Since polycarbonate layer 207 is clear, it acts as a window through which the inked logo or text information of ink layer 209 may be viewed when the battery is assembled. A layer of adhesive 211, for example 468MP Hi Performance adhesive from 3M Corp. which is approximately 0.005 inch thick is then laminated under pressure onto sheet 207 as shown in FIG. 8. A protective layer 213 of very thin release paper covers adhesive prior to folding of sheet 207 and final assembly. The release paper employed for protective layer 213 is sufficiently thin to permit relatively easy bending and folding of the polycarbonate sheet on which it is disposed. More particularly, in the present embodiment the invention, release paper 213 is approximately 4 mils (004 inches) in thickness.

As shown in FIG. 7, the central region of sheet 207 within rectangle 217 includes no adhesive or protective paper layer. An adhesive-free zone 219 is thus created for the purpose of permitting cells 15 to safely vent to the environment. Without this adhesive-free zone, the battery pack would be completely sealed and could not properly vent to the ambient.

It is also noted that a circular ink-free region 221 is situated within adhesive free zone 219 to permit the light from LED 35 to shine through when battery 10 is completely assembled. It is still further noted that the lowermost corners of housing 205 in FIG. 7 are cut at approximately 45 degree angles as shown. Angled portions 223 and 224 are thus formed in housing 205.

At this point, the main housing 205 depicted in FIG. 7 has been fabricated from the above-described layers. Main housing 205 is presently flat. To form main housing 205 into the folded box-like structure of FIG. 6, main housing 205 is first embossed at fold lines 215, 220, 225 and 230 to form creases at those fold lines exhibiting a depth of approximately 0.003 inches in one embodiment. Then, after main housing 205 is so embossed, housing 205 is bent or folded along each of fold lines 215, 220, 225 and 230 to form an approximate right angle at each of the fold lines thus producing the folded main housing 205 depicted in FIG. 6. It is noted that the layered polycarbonate sheet of FIG. 8 is preferably cut to the size and configuration of FIG. 7 simultaneously with the above described embossing operation which creates the creases at fold lines 215, 220, 225 and 230. A die/press having both cutting knives and creasing knives can be used to cut the perimeter of main housing 205 and to emboss fold lines 215, 220, 225 and 230 to form the above-described creases therein.

Once the creases are formed at fold lines 215, 220, 225 and 230, the layered polycarbonate sheet can be folded without forming undesirable craving lines in the polycarbonate. The term "craving lines" refers to the white lines which typically form when polycarbonate is bent. Such craving lines are the precursor to fractures in the polycarbonate and ultimately breakage of the polycarbonate. Such craving lines are advantageously avoided by the embossing approach described above.

Returning momentarily to FIG. 7, it is seen that after the embossing and folding steps described above, housing 205 is divided into folded portions which correspond to front 10A, top 10B, back 10F and bottom 10E of battery pack 10 of FIG. 1. A comparison of FIG. 1 and FIG. 7 facilitates an understanding of how battery pack 10 is formed.

Housing end pieces 210A and 210B of FIG. 6 are formed by the same polycarbonates sheet, ink layer, adhesive layer, protective paper layer process described above. As seen in FIG. 6, end pieces 210A and 210B are substantially U-shaped. End piece 210A includes front and back surfaces 210C and 210D, respectively, and a side surface 210E which joins front and back surfaces 210C and 210D at respective fold lines as shown. The folds in housing end pieces 210A and 210B are created by the same embossing/creasing technique described above. Housing end pieces 210A and 210B are dimensioned to fold around the respective opposed lateral ends 300 and 305 of the cell subassembly of FIG. 2. FIG. 10 shows the cell subassembly after end pieces 210A and 210B are mounted thereon.

It is noted that, as seen in FIG. 6 and FIG. 10, the lowermost portion of end piece 210A is angled at 45 degrees to meet with angled portion 223 of main housing 205 when the battery is finally assembled. End piece 210B includes front and back surfaces 210F and 210G, respectively, and a side surface 210H which joins front and back surfaces 210F and 210G. The lowermost portion of end piece 210B is likewise angled at 45 degrees to meet with angled portion 224 of main housing 205 when the battery is finally assembled.

End piece 210A includes a circular opening 227 which aligns with input receptacle 25 when the battery is assembled. End piece 210B has a similar opening (also designated 227, but which is not visible in FIG. 6) for aligning with output receptacle 30 when the battery is assembled. End piece 210A includes another opening 229 which aligns with the clear ink-free region 221 of housing 205 when the battery is assembled. Light from LED 35 is thus able to shine through ink-free region 221 and opening 229 when battery 10 is plugged into a DC power source. Housing end pieces 210A and 210B are conveniently substantially identical.

To complete the assembly of battery 10 once the cell subassembly of FIG. 2 and main housing 205, together with housing end pieces 210A and 210B are prepared as described above, the following steps are taken. The completed cell subassembly of FIG. 2, which includes opposed ends 300 an 305, is now equipped with housing end pieces 210A and 210B as shown in FIG. 6 and more clearly in FIG. 10. More particularly, the protective paper is removed from the adhesive layer on housing end piece 210A and housing end piece 210A is then affixed to battery subassembly end 300. (See FIG. 2, 6 and 10) Side surface 10D of housing end piece 210A attaches to end 300 and hole 227 aligns with receptacle 25. In a similar manner, the protective paper is then removed from the adhesive layer on housing end piece 210B and housing end piece 210B is then affixed to battery subassembly end 305. Side surface 10C of housing end 210B attaches to end 305 and opening 227 (not visible in FIG. 6) of end piece 210B aligns with receptacle 30. The adhesive on end pieces 210A and 120B hold these end pieces to subassembly ends 300 and 305.

The battery subassembly with end pieces 210A and 210B is now installed in main housing 205 as shown in FIG. 6. More particularly, protective paper layer 213 layer is peeled off the inner surface of main housing 205 leaving the folded housing 205 shown in FIG. 6. Housing 205 is folded around the cell subassembly to form a substantially box-like structure. More particularly, the front side or flap 10A of housing 205 is flipped up momentarily to permit the completed cell subassembly of FIG. 2 (with end pieces as shown in FIG. 10) to be positioned within main housing 205 as shown in FIG. 6. Opposed battery ends 300 and 305 are aligned adjacent the edges of main housing 205 as illustrated.

The backs of the three cells 15A, 15B and 15C adhere to the exposed adhesive on the interior back side 10F of main housing 205. The lower flap 310 of main housing 205 is flipped up and adheres to the front of the three cells along their lowermost portion. The front side or front flap 10A is then pressed down onto the front of the three cells and adheres to those cells. The completed battery pack structure 10 of FIG. 1 is thus formed.

Returning momentarily to FIG. 2 and FIG. 4 it is noted that in actual practice a protective layer of foam 107 is glued to the side of circuit board 20 facing away from cells 15. This protects the battery housing from leads that may extend from the board 20 which might otherwise contact the interior of the battery housing. Damage to the ink layers on the battery housing is thus avoided. Moreover, foam 107 aids in compensating for any tolerance variations between circuit board 20 and housing top side 10B.

Returning again to FIG. 1, it is noted that main housing 205 is laterally dimensioned such that it does not fully overlap end pieces 210A and 210B. This assures that main housing 205 does not laterally extend beyond the end pieces and thus avoids the potential creation of a sharp edge which might be annoying to a user.

FIG. 9 provides a cross-sectional view of battery pack 10 of FIG. 1 taken along section line 9—9 so that the source of the structural integrity of battery pack 10 can be appreciated. It is seen that the upper surfaces of all three cells 15A, 15B and 15C are fixedly held to polycarbonate housing front side or flap 10A by adhesive layer 211 therebetween. Similarly, the bottom surfaces of all three cells are held to polycarbonate housing back side 10F by adhesive layer 211. Thus, housing front side 10A is held in substantially parallel relationship with housing back side 10F by adhesive layer 211 and cells 15 therebetween. An multi I-beam-like structure is thus formed with very substantial structural integrity. It is noted that, as seen in FIG.9, the end pieces 10C (210B) and 10D (210A) and the adhesive layer thereof also contribute to this I-beam-like structure. In FIG. 9, the cells 15A, 15B and 15 C act as the vertical part of the I-beam (or triple I-beam in this case). The housing front side 10A, in parallel with the housing back side 10F, act together as the horizontal members of the I-beam-like structure. The housing front side 10A is structurally connected to housing back side 10F in three significant places, namely at the major opposed plane pairs formed where the cells meet the housing front side 10A and the housing back side 10F. This arrangement surprisingly provides a very large amount of structural integrity from a relatively thin housing material which is normally rather flimsy when thin.

While the embodiment depicted in FIG. 2 is a triple I-beam-like structure since three cells 15 are employed, it will be appreciated that the same battery fabrication technique described above is readily employed to fabricate battery packs having two or more cells 15. When two cells are used, a double I-beam structure is achieved. When four cells are used, a quadruple I-beam structure results.

It is noted that the positioning adhesive used at locations 100 depicted in FIG. 2 to hold cells 15 in place at intercell spacing, S, is also shown here in FIG. 9 at locations 100. It is further noted that this adhesive serves the purpose of a positioning adhesive and does not contribute significantly to the structural integrity of battery pack 10. Rather, the I-beam like structure described above is believed to provide most of the structural strength of the battery pack.

As an alternative to the positioning adhesive at locations 100, adhesive tape stretched across cells 15 may be used to hold cells 15 in position prior to final assembly.

Another alternative to the positioning adhesive situated at locations 100 is to employ a connective sheet 400 of polycarbonate measuring approximately 7.2 inches by approx 4.5 inches and approximately 0.015 inches thick. In other words, connective sheet 400 is dimensioned to fit between end pieces 210A and 210B. Connective sheet 400 is outfitted with the same adhesive layer and release paper layer that was employed for main housing 205. To attach connective sheet 400 to cells 15A, 15B and 15C, the release paper layer is first removed. Connective sheet 400 is then placed on cells 15 as shown so as to extend across all three cells 15 to hold cells 15 in position in square, spaced, parallel relationship prior to final assembly of battery 10, namely, prior to placement of the subassembly of FIG. 11 into main housing 205. As seen in FIG. 11, connective sheet 400 extends from approximately 1 inch from the bottoms of cells 15 to the top of printed circuit board 20 but not onto foam 107. As already mentioned, connective sheet extends between end pieces 210A and 210B. Once the subassembly of FIG. 11 is completed, final assembly of battery pack 10 can proceed as described earlier While the above description sets forth a battery pack apparatus which exhibits high structural integrity, it is clear that a method of fabricating the battery pack is also disclosed. More particularly, a method of manufacturing a battery pack from a plurality of flat cells is disclosed. Each cell includes upper and lower major surfaces and is situated in side-by-side relationship in a cell subassembly. The method includes the steps of forming a layer of adhesive on a plastic sheet. The method also includes the step of embossing the sheet along a plurality of lines on the sheet to form a plurality of creased fold lines in the sheet. The method further includes the step of folding the sheet around the cell subassembly to form a box-like structure which substantially surrounds the cell subassembly.

Another embodiment of the method of the invention includes the step of situating the cells in side-by-side relationship to form a cell subassembly exhibiting a substantially uniform spacing between the cells. Again, the upper surfaces of the cells are aligned in a common upper plane and the lower surfaces of the cells are aligned in a common lower plane. The method also includes the step of forming a layer of adhesive on a major surface of a plastic sheet which will be designated as the adhesive surface of the sheet. The method further includes the step of cutting the plastic sheet to a form that will substantially surround the cell subassembly when folded around the cell subassembly. The method still further includes the step of embossing the sheet to form a plurality of creased fold lines in the sheet. The method also includes the step of folding the sheet at the fold lines around the cell subassembly to form an enclosure which substantially surrounds the cell subassembly and which includes substantially parallel adhesive-covered upper and lower sheet section surfaces which face each other. In this manner, the adhesive-covered upper sheet section surface adheres to the upper major surfaces of the cells and the adhesive-covered lower sheet section surface adheres to the lower major surfaces of the cells, thus forming a battery pack exhibiting a substantially I beam-like structure which provides significant structural integrity.

Still another embodiment of the invention is depicted in FIG. 12A-21. Rather than employing a wraparound enclosure including an upper and lower sheet surface, one of which is directly adhesively attached to a common surface of the cells to form an I-beam like structure as in one earlier described embodiment, the embodiment of FIG. 12A-21 employs an upper connective sheet which is adhesively coupled to the upper surfaces of a plurality of flat cells and a lower connective sheet which is adhesively coupled to the lower surfaces of the plurality of flat cells to form a battery exhibiting a substantially I-beam like structure.

Figures 12A, 12B:
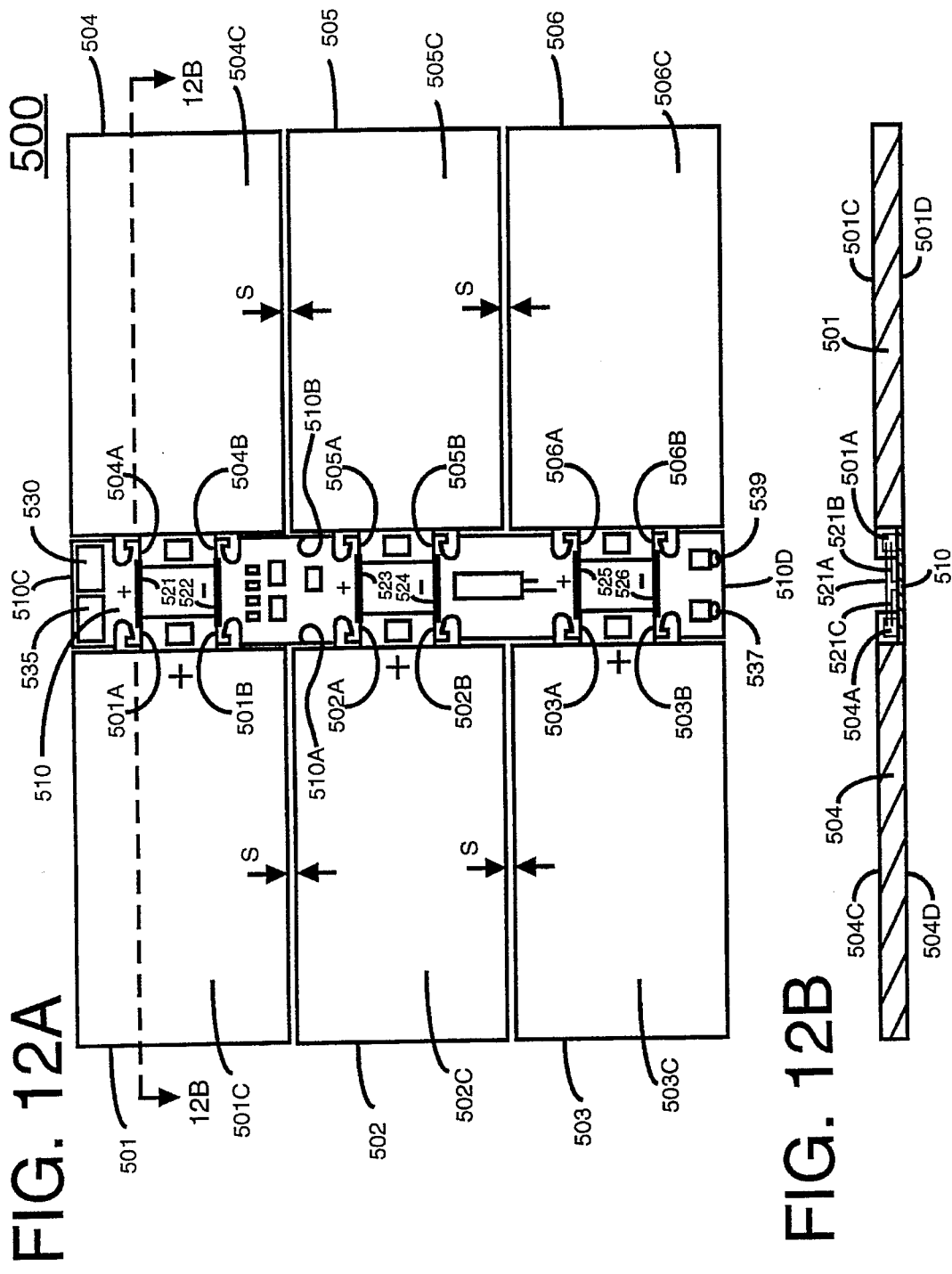
FIG. 12A is a top view of an alternative embodiment which depicts a battery assembly including flat cells and a central connective member.
FIG. 12B is a cross sectional view of the battery assembly of FIG. 12A taken along section line 12B—12B.

More particularly, such a battery 500 is fabricated in the following manner. As shown in FIG. 12A, a partially complete battery 500 includes a plurality of flat cells 501, 502, 503, 504, 505 and 506 which are mechanically and electrically connected by a connective member 510. In this particular embodiment, connective member 510 is a rectangular printed circuit board on which electrical circuitry, later described, is situated. Flat cells 501, 502, 503, 504, 505 and 506 include positive terminals 501A, 502A, 503A, 504A, 505A and 506A, respectively. Flat cells 501, 502, 503, 504, 505 and 506 further include negative terminals 501B, 502B, 503B, 504B, 505B and 506B, respectively. As seen in FIG. 12A, the terminal ends of flat cells 501, 502 and 503 face one side 510A of connective member 510 and the terminal ends of the remaining flat cells 503, 504 and 505 face the opposed side 510B of connective member 510. Flat cells 501–506 include opposed substantially flat upper surfaces 501C–506C which are shown in FIG. 12A and further include substantially flat lower surfaces 501D–506D of which flat lower surfaces 501D and 504D are shown in the cross section of FIG. 12B.

The coupling of flat cells 501–506 to each other and to connective member 510 is now discussed. Cells 501–506 and connective member 510 are situated substantially in the same plane. More particularly, the upper surfaces 501C–506C of flat cells 501–506 are situated in substantially the same plane and the lower surfaces 501D–506D of flat cells 501–506 are situated in substantially the same plane.

For example purposes, the connection of flat cell pair 501–504 is now described. This description is also illustrative of the connection of flat cell pairs 502–504 and 503–506. As seen in FIG. 12A, positive terminal 501A is coupled to positive terminal 504A by a conductor assembly 521. In one embodiment, conductor assembly 521 is fabricated from 20 gauge electrically conductive wire material. Conductor assembly 521 includes a cell to cell connection member 521A which is coupled to positive terminal 501A and positive terminal 504A as shown in FIG. 12B. FIG. 12B is a cross sectional view of battery 500 of FIG. 12A taken along section line 12B–12B. Cell to cell connection member 521A is substantially parallel to a spaced apart from connective member or board 510. Conductor assembly 521 also includes a cell to board member 521B which couples positive terminal 501A to a land on connective member. Conductor assembly 521 further includes a cell to board member 521C which couples positive terminal 504A to a land on connective member. The above mentioned connections are achieved by soldering. In this manner, the positive terminals of flat cells 501 and 504 are both mechanically and electrically connected to each other and to connective member or board 510 by conductor assembly 521. A conductor assembly 522, shown in FIG. 12A and which is substantially the same as conductor assembly 521, is employed to mechanically and electrically couple the negative terminals of flat cells 501 and 504 to each other and to connective member or board 510. In this manner, flat cell pair 501–504 is electrically connected together in parallel.

A conductor assembly 523 which is substantially the same as conductor assembly 521 is used to electrically and mechanically couple the positive terminals of flat cell pair 502 and 505 together and to connective member 510. Likewise, a conductor assembly 524 which is substantially the same as conductor assembly 522 is used to electrically and mechanically couple the negative terminals of flat cell pair 502 and 505 together. In this manner, flat cell pair 502–505 is electrically connected together in parallel.

A conductor assembly 525 which is substantially the same as conductor assembly 521 is used to electrically and mechanically couple the positive terminals of flat cell pair 503 and 506 together and to connective member 510. Likewise, a conductor assembly 526 which is substantially the same as conductor assembly 522 is used to electrically and mechanically couple the negative terminals of flat cell pair 503 and 506 together. In this manner, flat cell pair 503–506 is electrically connected together in parallel.

Power connectors 530 and 535 are situated at end 510C of connective member 510. A DC voltage source, for example a wall type power transformer supply, is coupled to connector 530 which is also referred to as charger connector 530. In this particular embodiment, a battery charger such as the Model No. 5652, manufactured by Apple Computer, Inc. and having an output voltage of 7.5 volts at 3,000 mA, is coupled to charger connector 530 to provide battery 500 with charging energy when battery 500 is fully assembled. A computer (not shown) or other electrical device which requires a source of battery power is coupled to connector 535. Connector 535 is referred to as the computer power connector or the charged device connector.

Indicator lights 537 and 539 are situated at end 510D of connective member 510 as shown in FIG. 12A. Indicator light 537 is an LED which indicates charge rate and indicator light 539 is an LED which indicates that the cells are charging.

When flat cells 501–506 are connected to connective member or board 510, the intercell spacing, S, is maintained between adjacent cells as previously described. In this particular embodiment, the intercell spacing, S, is typically within the range of approximately 0.005 inches to approximately 0.025 inches. One way to establish this intercell spacing is to install temporary spacers (not shown), for example a metal blade of thickness S, between the cells during assembly. These spacers can be remove prior to final assembly.

Once the intercell spacing is established as indicated in FIG. 12A, an upper connective sheet 540 is spread across the upper surfaces 501C–506C of flat cells 501–506 as shown in FIG. 13A. Connective sheet 540, like connective sheet 400 shown in FIG. 11, is fabricated from polycarbonate. Connective sheet 540 is outfitted with the same adhesive layer and release paper layer that was employed for main housing 205. The adhesive layer is designated as adhesive layer 540A in the cross section of FIG. 13B which depicts flat cells 501–506 after application of connective sheet 540 thereto. The layer of release paper which is situated on adhesive layer 540A is removed prior to application of connective sheet 540 to flat cells 501–506 and thus the layer of release paper is not visible in FIG. 13B. Adhesive layer 540A is similar to adhesive layer 211 depicted in the housing of FIG. 8. The release paper layer is similar to release paper 213 depicted in the housing of FIG. 8. It is noted that in this particular embodiment connective sheet 540 is clear since no ink is applied thereto. However, if desired for other applications ink can be applied to connective sheet 540 if it is not desirable to have connective sheet 540 be transparent. It is noted that connective sheet 540 is not drawn to scale in FIG. 13B and that in actual practice connective sheet 540 is substantially thinner than the thickness of the battery cells.

In more detail, to attach connective sheet 540 to cell surfaces 501C to 506C, the release paper layer is first removed. Connective sheet 540 is then placed on cell surfaces 501C–506C so as to extend across all 6 cells 501–506 to hold the cells in position in square, spaced, parallel relationship as shown in FIG. 13. As noted earlier, sheet 540 includes an adhesive layer 540A which holds the sheet to cells 501–506. Connective sheet 540 is dimensioned to fit between housing end pieces which will be attached later to the cell assembly depicted in FIG. 13A. For this reason, connective sheet 540 is dimensioned to leave open regions 548 and 550 above flat cells 501–506.

It is noted that in this particular embodiment, polycarbonate sheet 540 is substantially clear or translucent. Thus, in FIG. 13A, the components of the battery 500 structure below connective sheet 540 are visible.

It is also noted that in one embodiment depicted in FIG. 13A, cells 501–506 include cell heads 501E–506E which contain the terminals of the cells, for example terminals 501A and 501B. In the particular cells employed in this embodiment, cells 501–506 also include top terminals 501F–506F (shown in FIG. 13A) and bottom terminals 501G–506G (not shown in this view). To accommodate top terminals 501F–506F, connective sheet 540 includes openings 541–546 atop top terminals 501F–506F. The purpose of openings 541–546 is to ensure that the final outer enclosure (the main housing section 700, later described) is smooth and free of bumps and surface irregularities.

Openings 541–546 may be circular as shown, or square, rectangular or other geometry. Top terminals 501F–506F and bottom terminals 501G–506G are optional. If batteries without such top and bottom terminals are employed, then openings 541–546 can be omitted. Connective sheet 540 also includes a rectangular opening (not shown) above charger power connector 530 and computer power connector 535 for the purpose of allowing an extra 0.015 inch clearance above power connector 535 to ensure that the final outer enclosure is smooth and free of bumps and irregularities.

Figure 14:
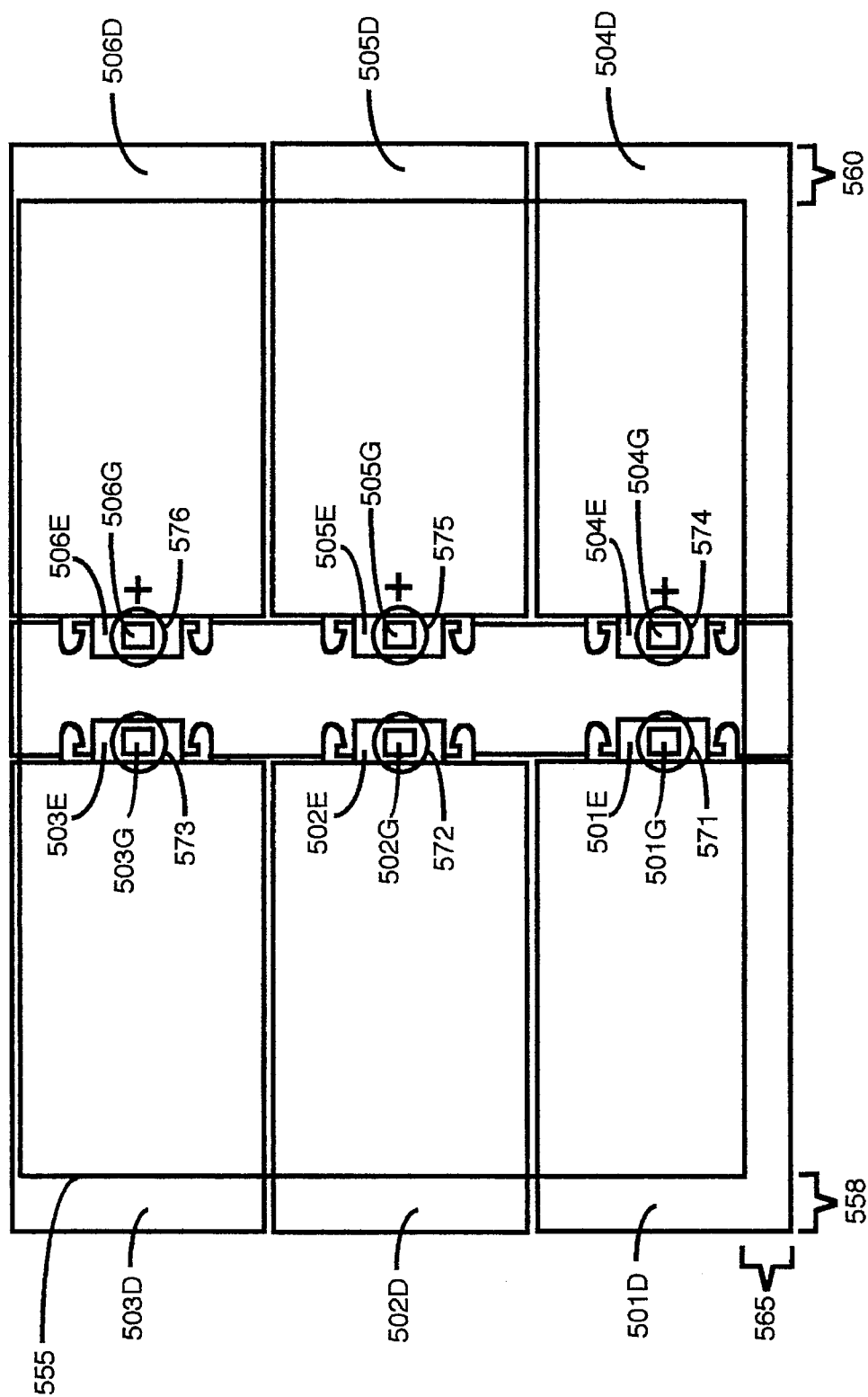
FIG. 14 is a bottom plan view of the battery assembly after application of a lower connective sheet.

After upper connective sheet 540 is adhesively coupled to cell top surfaces 501C–506C, as shown in FIG. 13A, a lower connective sheet 555 is adhesively coupled to the lower surfaces 501D–506D as shown in FIG. 14. Lower connective sheet 555 is substantially similar to upper connective sheet 540. Connective sheet 555 is dimensioned to fit between end pieces which will be attached later to the cell assembly depicted in FIG. 14. For this reason connective sheet 555 is dimensioned to leave open regions 558 and 560 above flat cells 501–506. As shown in FIG. 14, connective sheet 555 is also dimensioned to leave an open region 565 above flat cells 501D and 504D to receive a main housing end flap 720 (not shown) which is described later.

Bottom terminals 501G–506G of cell heads 501E–506E are visible in FIG. 14. Lower connective sheet 555 includes openings 571–576 above respective bottom terminals 501G–506G as illustrated. Openings 571–576 may be circular as shown, or square, rectangular or other geometry. As noted earlier, top terminals 501F–506F and bottom terminals 501G–506G are optional. If batteries without such top and bottom terminals are employed, then openings 571–576 can be omitted.

Figure 15A:
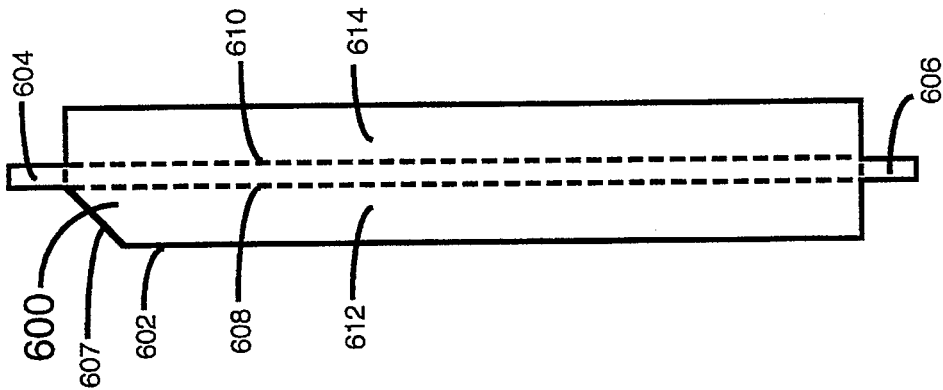
FIG. 15A is a plan view of a first end piece for the battery assembly.
Figure 15B:
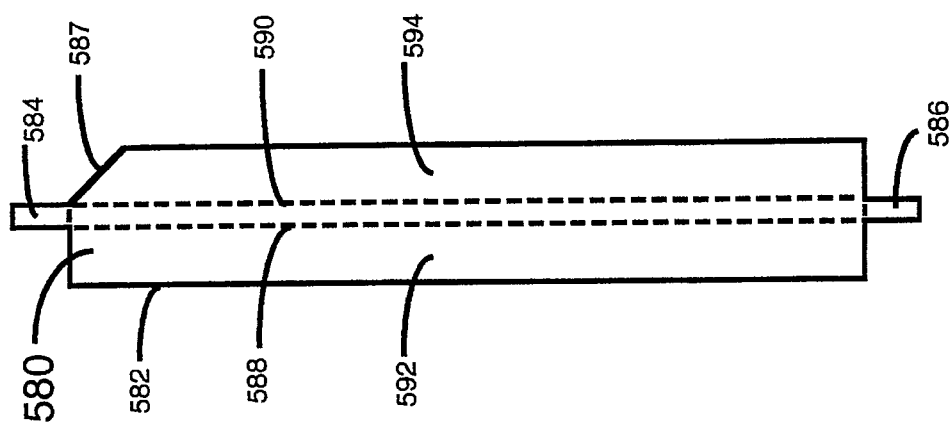
FIG. 15B is a plan view of a second end piece for the battery assembly.

Substantially identical housing end pieces 580 and 600 are depicted in FIGS. 15A and 15B, respectively. End pieces 580 and 585 are fabricated from the same material as housing 200 described earlier, namely polycarbonate covered with adhesive and release paper in one embodiment. End piece 580 is cut in the form depicted in FIG. 15A. More particularly, end piece 580 includes a rectangular main section 582 from which small side flaps 584 and 586 extend. Fold lines 588 and 590 are embossed in end piece 580 as shown. End piece 580 is folded along fold lines 588 and 590 to form large side flaps 592 and 594. Large side flap 594 includes an angled edge 587 which in one embodiment is oriented at an angle of approximately 45 degrees with respect to the longitudinal dimension of end piece 580. In this manner, angled edge 587 will substantially meet with a corresponding angled edge 720A of main housing end flap 720 which is discussed later in conjunction with FIG. 17A and FIG. 18.

Figure 16:
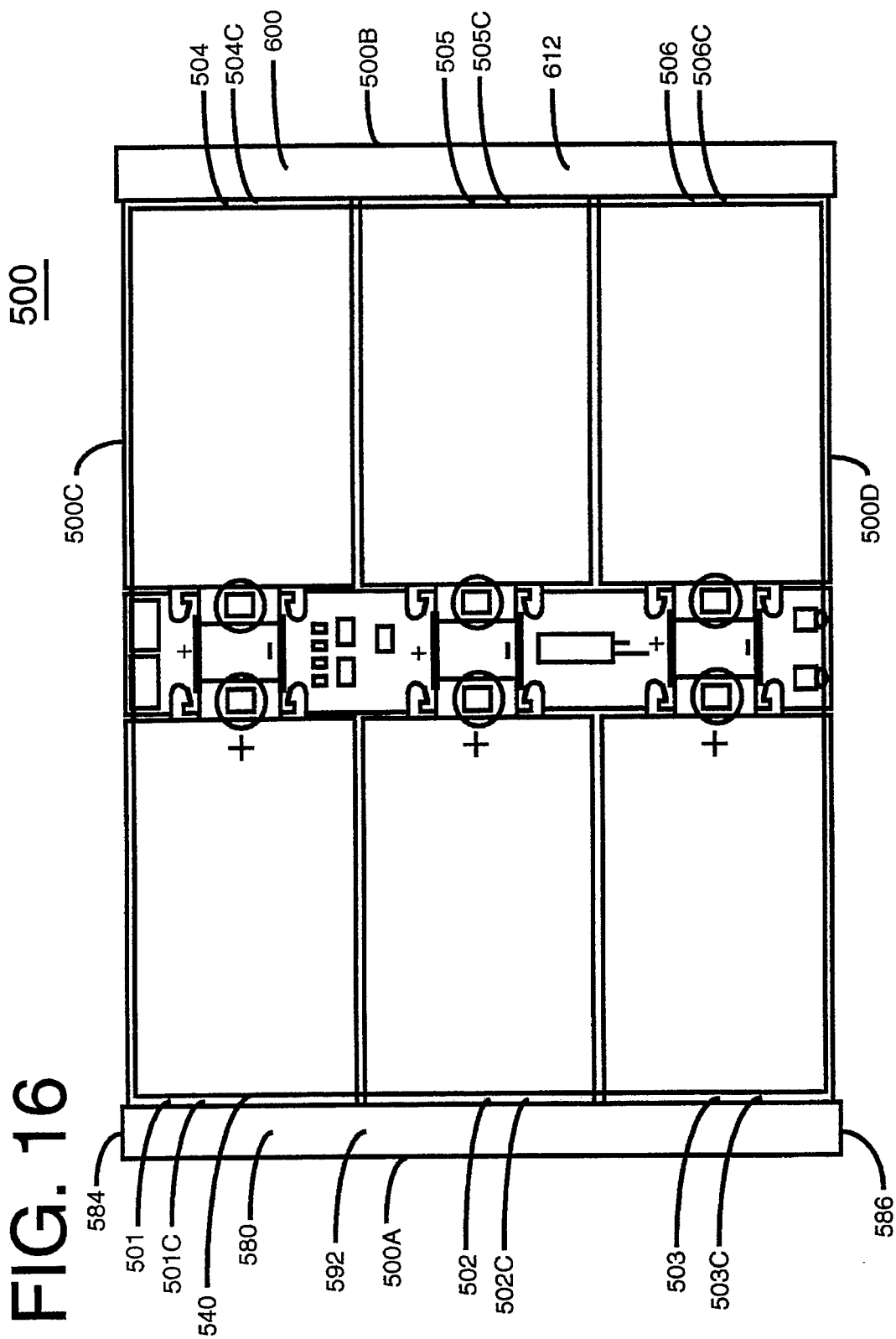
FIG. 16 is a top plan view of the battery assembly after installation of the first and second end pieces.

The release paper (not shown) is removed from housing end piece 580 and housing end piece 580 is mounted at and about end 500A of battery 500 as shown in FIG. 16. Small side flaps 584 and 586 are positioned in adhesive contact with cells 501 and 503 respectively. Large side flap 592 is positioned in adhesive contact with cell top surfaces 501C, 502C and 503C as shown in FIG. 16. Large side flap 594 (not shown) is positioned in adhesive contact with cell bottom surfaces 501D, 502D and 503D (not visible in FIG. 16).

Housing end piece 600 is fabricated in substantially the same manner as housing end piece 580 as shown in FIG. 15B. Housing end piece 600 includes main section 602 from which small side flaps 604 and 606 extend. Fold lines 608 and 610 are embossed in end piece 600 as shown. End piece 600 is folded along fold lines 608 and 610 to form large side flaps 612 and 614. Large side flap 612 includes an angled edge 607 which in one embodiment is oriented at an angle of approximately 45 degrees with respect to the longitudinal dimension of end piece 600. In this manner, angled edge 607 will substantially meet with a corresponding angled edge 720B of main housing end flap 720 which is discussed later in conjunction with FIG. 17A and FIG. 18.

The release paper (not shown) is removed from housing end piece 600 and housing end piece 600 is mounted at and about end 500B of battery 500 as shown in FIG. 16. Small side flaps 604 and 606 are positioned in adhesive contact with cells 504 and 506 respectively. Large side flap 612 is positioned in adhesive contact with cell top surfaces 504C, 505C and 506C as shown in FIG. 16. Large side flap 614 (not shown) is positioned in adhesive contact with cell bottom surfaces 504D, 505D and 506D (not visible in FIG. 16).

In addition to the housing end pieces 580 and 600, the housing of battery 500 includes a main housing section 700 as shown in FIG. 17A. Main housing section 700 is fabricated from the same material as housing 200, namely polycarbonate covered with a layer of ink which is covered with a layer of adhesive and then release paper. FIG. 17B is a cross section of housing 700 of FIG. 17A taken along section line 17B–17B. More particularly, FIG. 17B shows main housing section 700 including a layer of polycarbonate material 701 on which an ink layer 702 is disposed. A layer of adhesive 703 is disposed on ink layer 702 and a layer of release paper 704 is situated on adhesive layer 703. Polycarbonate layer 701 is similar to polycarbonate layer 207 in the housing of FIG. 8. Likewise, ink layer 702, adhesive layer 703 and release paper layer 704 are similar to ink layer 209, adhesive layer 211 and release paper layer 213, respectively, of the housing of FIG. 8 which was discussed earlier. It is noted that housing end pieces 580 and 600 are fabricated from the same material as housing main section 700 shown in FIG. 17B.

Main housing section 700 exhibits a substantially rectangular shape as depicted in FIG. 17A. Main housing section 700 is embossed at fold lines 702, 704, 706 and 708. Circular openings 710 and 712 are formed in main housing section 700 to permit access to charger power connector 530 and computer power connector 535, respectively. Ink is not present at view ports 714 and 716 so that main housing section 700 is clear at view ports 714 and 716 to permit viewing of charge rate indicator LED 537 and charging indicator LED 539, respectively, when main housing section 700 in installed on the battery assembly of FIG. 16.

Main housing section 700 is folded at fold lines 702, 704, 706 and 708 to divide main housing 700 into a main housing end flap 720, a main housing first end portion 722, a main housing top portion 724, a main housing second end portion 726 and a main housing bottom portion 728, all as shown in FIG. 17A.

Hook and loop fastener members 731, 732, 733 and 734 are fixed to housing bottom portion 728 as shown in FIG. 17A to attach the complete battery to a computer or other device to be charged. Pads or feet 741, 742, 743 and 744 are fixed to main housing top portion 724. These pads or feet are made of rubber or other resilient material feet which can protect the working surface on which the battery (with computer attached thereto) is placed.

While for convenience in description and illustration housing bottom portion 728 is referred to as a bottom and housing top portion 724 is referred to as a top, it will be appreciated that in actual practice the battery will be inverted from the position described such that feet 741, 742, 743 and 744 are situated on the working surface and hook and loop fastener members 731, 732, 733 and 734 face upward to connect with a computer which is situated above the battery.

The adhesive side 700A (after release paper removal) of main housing section 700 is shown in FIG. 17A. Hook and loop fastener members 731, 732, 733, 734 and pads or feet 741, 742, 743, 744 are situated on the nonadhesive side 700B which is opposite and parallel with adhesive side 700A. Therefor these elements are shown in dashed lines in FIG. 17A.

Figure 18:
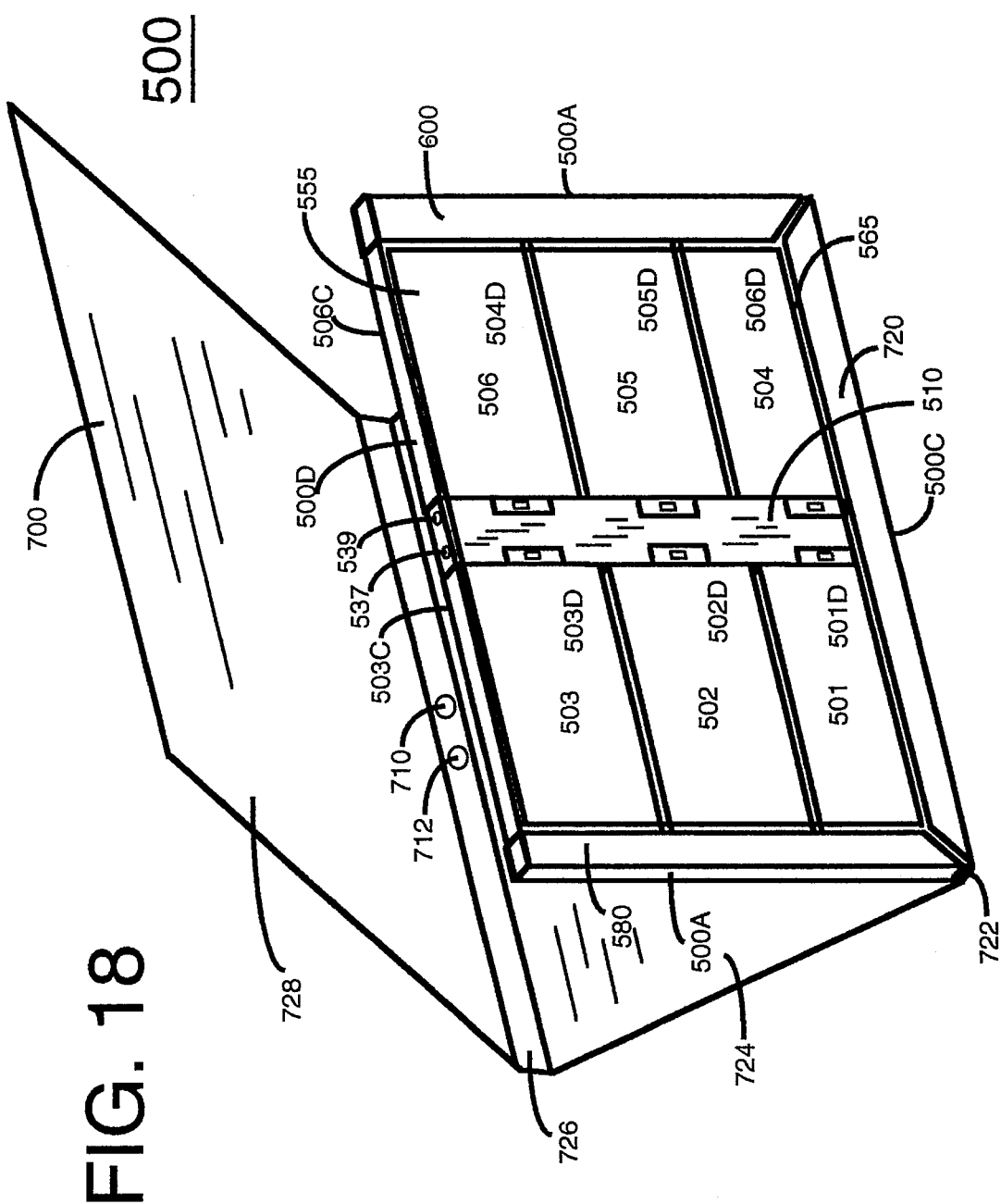
FIG. 18 is a bottom perspective view showing the battery assembly while the main housing section is being installed thereon.

The release paper is removed from main housing section 700 and main housing end flap 720 is adhesively coupled to open region 565 as shown in FIG. 18. Main housing first end portion 722 is then adhesively coupled to cells 501 and 504 at battery assembly end 500C as main housing section 700 is wrapped around the cells of the battery assembly shown. FIG. 18 shows the battery assembly after end flap 720 and first end portion 722 are attached to the battery assembly and prior to attachment of the remainder of main housing section 700 to the battery assembly.

To further assemble battery 500, the process of wrapping main housing section 700 around the battery assembly is continued until main housing top portion 724 is in contact with the top side (not visible) of cells 501–506 (not visible in FIG. 18). In this manner, main housing top portion 724 becomes adhesively coupled to the upper connective sheet 540 (not visible) atop the cell top surfaces 501C–506C of which top surfaces 503C and 506C are visible and labelled in FIG. 18.

The process of wrapping main housing section 700 around the battery assembly continues until second end portion 726 is adhesively coupled to cells 503 and 506 at battery assembly end 500D. The wrapping process further continues until main housing bottom portion 728 is adhesively attached to the lower connective sheet 555 which is situated on the cell bottom surfaces 501D–506D (visible in FIG. 18 through transparent lower connective sheet 555). It is noted that in this wrapping process, main housing section 700 is situated between housing end pieces 580 and 600. The completed battery 500 of FIG. 19 is thus fabricated. FIG. 19 is a bottom perspective view of battery 500.

While in previous views, the designations 500A, 500B, 500C and 500D were used to indicate various surfaces on the interior of the battery, the designations 500A', 500B', 500C' and 500D' are used in FIG. 19 to indicate corresponding adjacent surfaces on the exterior of battery 500. More particularly, these numbers designate opposed short ends 500A' and 500B' which are parallel to each other and situated at end pieces 580 and 600, and opposed long ends 500C' and 500D' which are parallel to each other. Also included among the battery exterior surfaces of FIG. 19 is bottom surface 500E. Top surface 500F, which is not visible in FIG. 19, is parallel with and opposed to bottom surface 500E.

FIG. 20 is a cross section of the completely assembled battery of FIG. 19 taken along section line 20—20. While for clarity the adhesive layer on main housing section 700 is not separately shown in FIG. 20, it should be understood that the adhesive layer is situated on main housing section 700 on the surface thereof facing inward on battery 500. In this manner, main housing section 500 is formed around and adheres to upper connective sheet 540 and lower connective sheet 555 in this particular embodiment.

Figure 21:
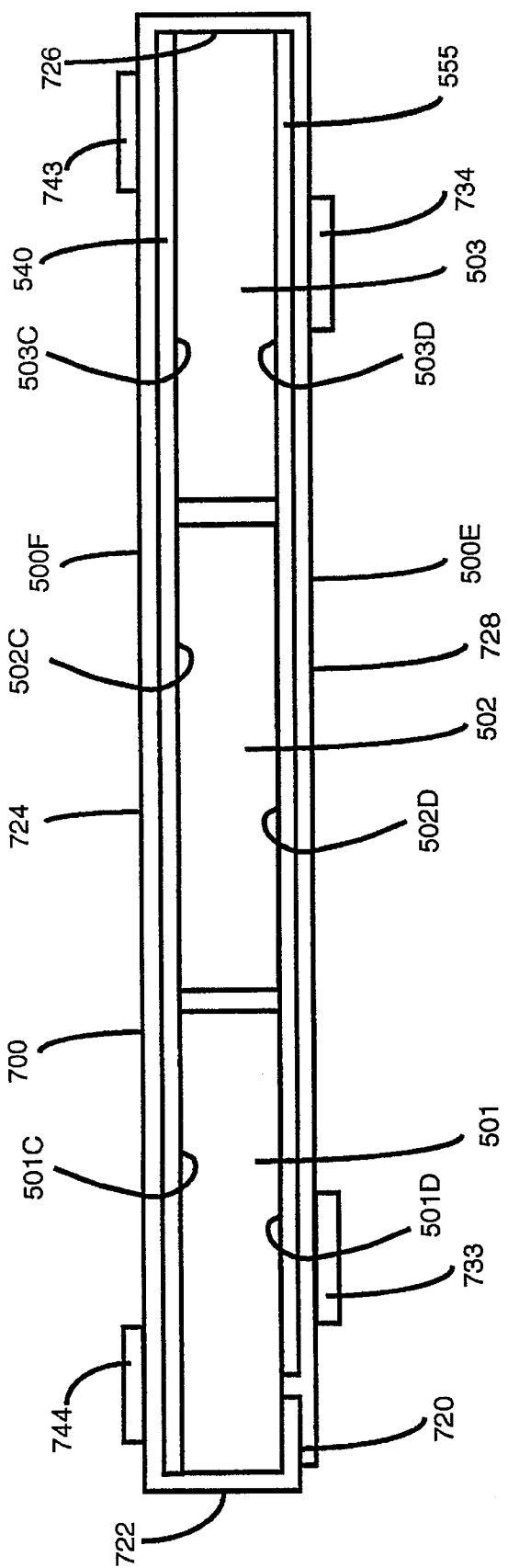
FIG. 21 is a close up view of the cross section of FIG. 20.

To more clearly illustrate the completed battery 500, the view of FIG. 20 is rotated and enlarged in FIG. 21. As seen in FIG. 21, upper connective sheet 540 is adhesively coupled to cell top surfaces 501C, 502C and 503C by a layer of adhesive therebetween (not shown in this view). Lower connective sheet 555 is adhesively coupled to cell bottom surfaces 501D, 502D and 503D by a layer of adhesive therebetween (not shown in this view). The adhesive layer 5450A for upper connective sheet 540 was shown earlier in FIG. 13 and is not repeated in FIG. 21 for clarity. Again, it is noted that in actual practice, battery 500 of FIG. 21 would be inverted from the position shown in FIG. 21. In this manner, feet 743 and 744 face downward to the working surface (not shown) and hook and loop fasteners 733 and 734 face upward to couple battery 500 to a computer or other device.

It is noted that upper connective sheet 540 and lower connective sheet 555 together with flat cells such as cells 501, 502 and 503 therebetween form a substantially I-beam like structure which provides battery 500 with much of its structural integrity. Connective sheets 540 and 555 with their respective layers of adhesive thereon form the horizontal members of this I beam-like structure. Flat cells 501–506 form the vertical members of this I beam-like structure. The main housing section 700, which in one embodiment is formed around the inner battery assembly of cells and connective sheets, also contributes to the structural integrity of the battery to a lesser extent. Main housing section 700 keeps dust and other contaminants from entering battery 500. Main housing section 700 also serves as a convenient location to print operating instructions, logos, voltage/current charging data and other information. It is noted that in the particular embodiment illustrated, most of the structural integrity of the battery comes from the I beam structure formed by the flat cells 501–506 and connective sheets 540 and 555.

Figure 22:
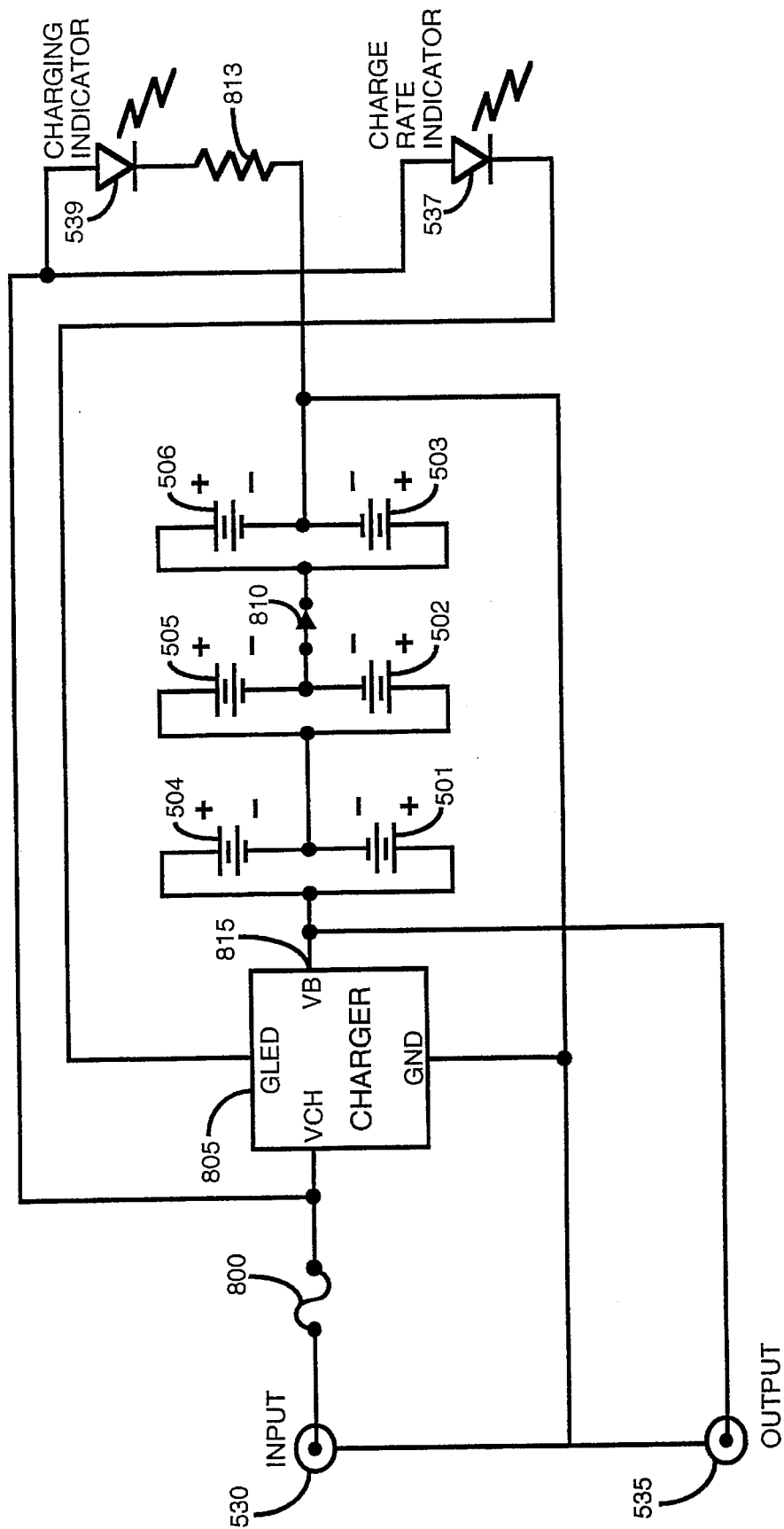
FIG. 22 is an electrical schematic diagram of the battery cell array and charger module of one particular embodiment of the battery.

FIG. 22 shows a schematic diagram of battery 500. It is noted that in this particular embodiment, cells 501 and 504 are coupled together in parallel to form cell pair 501/504. Similarly, cells 502 and 505 are coupled together in parallel to form cell pair 502/505. Likewise, cells 503 and 506 are coupled together in parallel to form cell pair 503/506. Cell pair 501/504, cell pair 502/505 and cell pair 503/506 are then coupled together in series as shown in FIG. 22. Other combinations of cells and cell pairs are of course possible according to the voltage and current requirements of the particular application.

Battery 500 includes power input 530 or jack which is also known as the charger power connector 530. Charger power connector 530 is coupled to a source of DC power or battery charger as described earlier. Battery 500 includes a power output 535 or jack which is also know as computer power connector 535. Power output 535 is coupled to a laptop computer or other device which is to be supplied with DC battery power.

A series fuse 800 is coupled between power input 530 and the VCH input of a charger module 805. Charger module 805 is an active voltage monitoring charger module which allows initial fast charging to approximately 7.5 volts while limiting the long-term battery charge voltage to approximately 7.15 volts in this particular embodiment. Charger module 805 thus provides fast charge and slow charge modes. The VB output of charger module 805 is coupled to the common positive terminals of cell pair 501/504 and to power output 535 as shown. The common negative terminals of cell pair 503/506 is coupled to the ground terminal of charger module 805 and to the ground connection of power input connector 530 and power output connector 535.

An overcurrent cutout switch 810 is coupled in series between cell pair 502/505 and cell pair 503/506 as shown in FIG. 22. One cutout switch which can be used as cutout switch 810 is the Model No. C101740 manufactured by Pepi. The common negative terminals of cell pair 503/506 are coupled through a series coupled resistor 813 and light emitting diode (LED) 539 to the VCH input of charger module 805. In this manner, a charging indicator is formed by LED 539. LED 539 lights up when the battery cells are charging.

The GLED output of charger module 805 is coupled through an LED 537 back to the VCH terminal of the charger module. In this manner a charge rate indicator is provided by LED 537. LED 537 lights up when charger module 805 is in the slow charge mode. Otherwise, charge rate indicator LED 537 is off.

Figure 23:
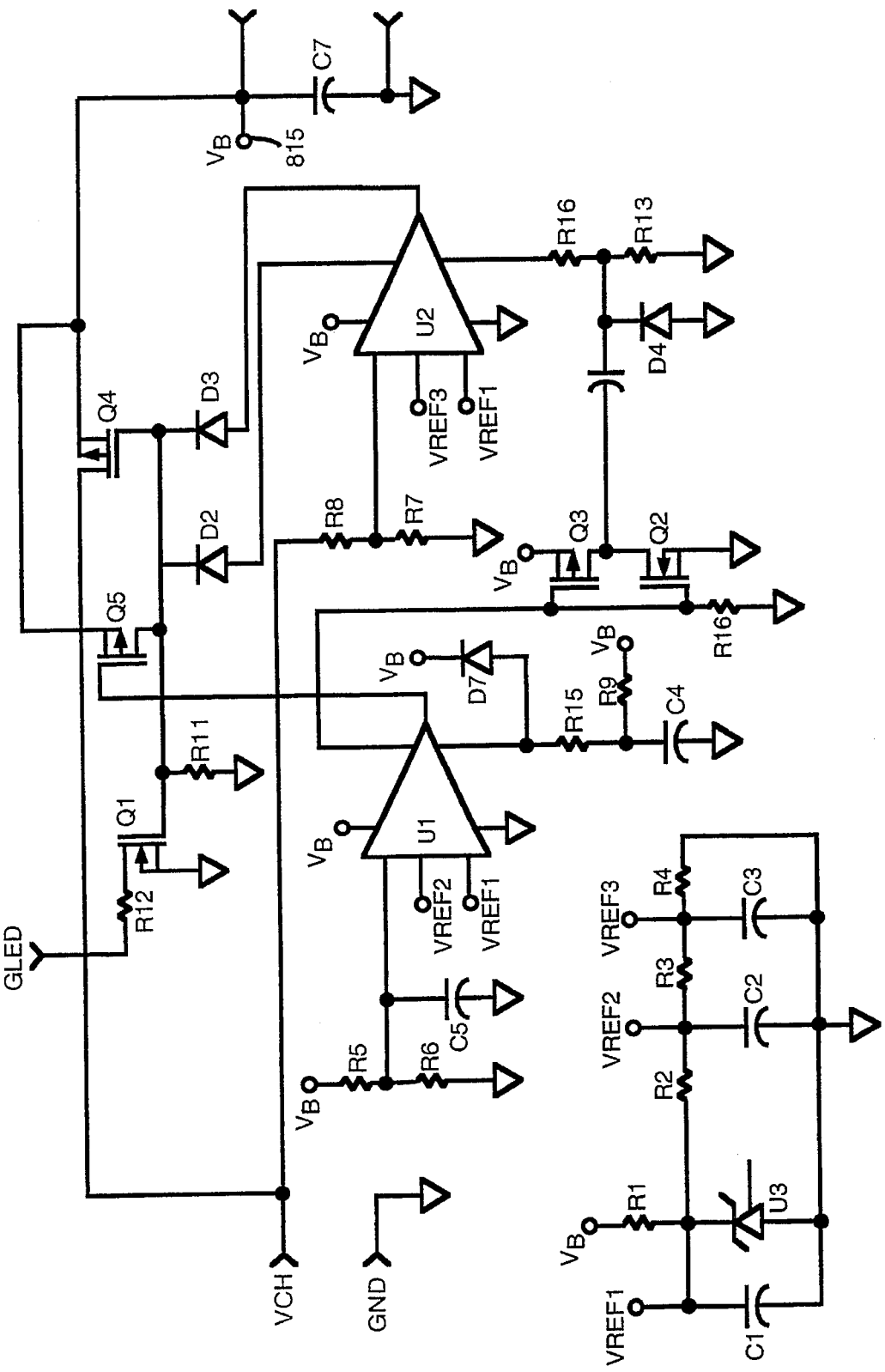
FIG. 23 is a detailed schematic diagram of the charger module of the battery.

FIG. 23 is a detailed schematic diagram of one charging circuit which can be used as charger module 805. The VCH, GLED, VB and GND terminals of charger module 805 of FIG. 22 are clearly marked in FIG. 23 for cross reference purposes. The VCH input terminal is coupled to a DC voltage source or charger supply and the GND terminal is coupled to ground. VCH is the charging voltage which is received from the battery charger (charger supply) coupled thereto, for example, the earlier mentioned battery charger Model No. 5652, manufactured by Apple Computer, Inc. which has an output voltage of 7.5 volts at 3,000 mA. It will be recalled that such a battery charger is coupled to charger connector 530.

The operation of charger module 805 principally involves the gating on and off of power FET Q4 to control the coupling of the charger supply at VCH to the battery cells at VB terminal 815. (For convenience, the designation VCH refers to both terminal VCH and the voltage at the VCH terminal. Likewise, the designation VB refers to both terminal VB and the voltage present an VB terminal 815.) In this particular embodiment, power FET Q4 is a Model No. SI94330 FET manufactured by Siliconix. When FET Q4 is switched on by appropriate gating action, the charger supply at terminal VCH is coupled to the cells at VB to charge the cells at a fast charge rate. However, when FET Q4 is switched off by appropriate gating action, then the charger module switches to a slow charge mode to continue charging the cells at a low charge rate.

More particularly, when charger module 805 detects that a particular battery charger (actually a predetermined charger voltage) is present at terminal VCH and when the battery cells at VB are depleted, FET Q4 is turned on and charger module 805 is in the fast charge state. During the time that charger module 805 is in the fast charge state, the battery charger at VCH is essentially coupled directly to the battery cells at VB. The particular Apple battery charger referenced above is current limited to 3 amps which in this particular embodiment is also the maximum recommended charge current allowed for the lead acid battery cells.

While in the fast charge mode or state, the battery voltage VB (and thus the charger voltage) rises over time while the charge current falls as governed by the battery cell characteristics. The charger voltage heads for 7.75 volts once it has exited its constant current limiting condition. Comparator U1 detects when the battery terminal voltage, VB, has exceeded 7.5 volts and it shuts off FET Q4 when this condition occurs. This turn-off action has the effect of inserting a diode between the charger at VCH and the battery cells at VB. The charging current through FET Q4 drops momentarily to zero as the battery voltage, VB, decays toward 7.15 volts. The charging current then rises to about 1 amp and the battery cells finish charging. The charging current slowly decays toward a steady state of about 20 mA where it stays if the charger is left on for extended periods of time. This is a slow "finish-up" charge which is referred to as the slow charge state.

The operation and topology of charger module 805 are now discussed in more detail. The circuitry of charging module 805 carefully controls the conditions under which FET Q4 is gated on an off to charge the cells at VB terminal 815. More particularly, precision voltage comparators U1 and U2 control the gating of power FET Q4. Before discussing the operation of precision comparators U1 and U2, the generation of the reference voltage levels VREF1, VREF2 and VREF3 which are coupled to these comparators is now briefly described. It is noted that the cell voltage at VB terminal 815 is likewise supplied to several nodes throughout charging module 805 which are also designated VB for consistency. A precision reference device U3 is coupled by a 191K ohm resistor R1 to VB as shown in FIG. 23. One precision voltage reference device which can be used as device U3 is the model No. LT1004 precision reference manufactured by Linear Technology in Milpitas, Calif. The voltage VB is stepped down by the voltage divider action of resistors R1, R2, R3 and R4 to provide the reference voltages VREF1, VREF2 and VREF3. In this particular embodiment, VREF1=1.235 v, VREF2=0.048 v and VREF3=0.004 v.

Precision comparators U1 and U2 in this particular embodiment are both Model No. LTC1041 precision comparators manufactured by Linear Technology of Milpitas, Calif. Comparators U1 and U2 compare the voltage provided to input 2 to the voltage at input 5 and input 3 thereof as will be discussed in more detail later.

Comparator U2 includes an input pin 2 which is coupled by the R7–R8 voltage divider to the charger supply voltage VCH as shown. Comparator U2 looks for the presence of the battery charger at VCH and determines whether or not the charger at VCH is supplying the correct operating voltage to charge the cells at VB terminal 815. Comparator U2 effectively determines whether or not the battery charger is present at VCH. Pin 8 and pin 4 of comparator U2 are coupled to VB and ground, respectively. Pin 5 and pin 3 of comparator U2 are coupled to VREF3 and VREF1, respectively. Pin 6 of comparator U2 is coupled by a voltage divider R16–R13 to ground as shown. Pin 7 of comparator U2 is coupled via diode D2 to the gate of power FET Q4. Output pin 1 is coupled via diode D3 to the gate of power FET Q4.

As stated above, when comparator U2 detects that the charger supply is present at VCH and comparator U1 (later described) determines that the battery voltage is sufficiently low that charging of the cells at VB terminal 815 is necessary, then power FET Q4 turns on to couple the charger at VCH to the cells at VB terminal 815.

The remaining precision comparator U1 is connected directly to the battery cells at VB terminal 815. More particularly, the voltage VB is coupled through a voltage divider R5–R6 to pin 2 of comparator U1. Pin 5 and pin 3 are coupled to the VREF2 and VREF3 voltages, respectively. Pin 8 and pin 4 of comparator U1 are coupled to supply VB and ground, respectively. Pin 6 of comparator U1 is coupled via a diode D7 to VB and via voltage divider R15–R9 to VB.

Comparator U1 measures the voltage exhibited by the battery cells at VB terminal 815 to determine if the battery cells are in need of charging. It looks at the voltage of the cells at VB terminal 815 to determine if the cells should be in the "fast charge mode" (when they are nearly completely depleted) or if they should be placed in the "slow charge mode" which completes the charging of the cells at a slow charge rate.

When comparator U1 determines that the battery cells exhibit a voltage less than 7.15 volts at VB in this particular case, then the output of comparator U1 toggles to turn power FET Q4 on in the fast charge state. However, if comparator U1 determines that the battery cells exhibit a voltage greater than 7.5 volts at VB, then FET Q4 is turned off so that the cells are charged at a slow charge state which is significantly less then the fast charge rate.

The charge control FET Q4 is not turned on unless a particular charger, such as the earlier mentioned Apple® charger, is plugged into the charger power connector 530 or jack (not shown in FIG. 23) which is coupled to VCH. This feature prevents the battery cells from dumping energy into a load or short circuit which is connected to the computer power connector 535 or jack (not shown in FIG. 23) which is coupled to VB. Comparator U2 determines if a particular charger, namely a charger with a particular output voltage, is connected to VCH. Charger U2 makes this determination of the presence of the charger by measuring a representation of the applied charger voltage at VCH and comparing it to the sum of VREF1 at U2 pin 3 and VREF3 at U2 pin 5. If the applied charger voltage at VCH is above the VCH detect threshold voltage level, VCH DETECT, then output pin 1 of U2 is driven low. This causes FET Q4 to be turned on by comparator U1 when needed as will be discussed later.

When the charger having a particular output voltage is removed from the charger power connector 530 or jack, the resulting drop in input voltage is compared to VREF1 less VREF3 by comparator U2. When the charger voltage is less then VREF1–VREF3, then the output of U2 goes high. This prevents FET Q4 from being turned on by comparator U1 even if the battery cell voltage is low enough to call for a charge from charger module 805. The difference between the VCH DETECT and VCH RELEASE threshold is hysteresis set by the voltage VREF3 at comparator U2 pin 5. In this particular embodiment, VCH DETECT=6.85 v and VCH RELEASE=6.81 v.

FET Q5, diode D2 and diode D3 cooperate to form a three input OR circuit such that any one of this OR circuit's inputs being high will cause the gate of FET Q4 to be high thus preventing FET Q4 from being turned on. Both U1 pin 1 and U2 pin 1 must be high to allow for fast charging by turning on FET Q4. U2 pin 7 generates a high pulse about 80 μsec long which occurs once per oscillator cycle. (Oscillator action will be discussed later.) This high pulse has the effect of turning off FET Q4 for a short time each oscillator cycle to allow the measurement of VCH without the battery voltage VB clouding the measurement. So, every oscillator cycle, VCH is measured to determine if the charger is present. Q5 is used in place of a diode like D2 and D3 to better turn off FET Q4. This maximizes the voltage drop across Q4's bulk diode in the slow charge mode. FET Q1 is driven off by the same signal which drives Q4 on. FET Q1 thus lights the charge indicator LED 537 whenever the charger is in the slow charge mode.

P channel MOSFETs have an internal bulk diode whose anode is connected to the drain and whose cathode is connected to the source. FET Q4, being a P channel MOSFET, allows current to flow through its bulk diode (VCH to VB) when in the off state. Since this is a silicon diode, its voltage drop is about 0.6 volts. This effectively drops the charging voltage from 7.75 volts at the charger to 7.15 volts at the battery during slow charge mode.

An RC oscillator running at a period of about 2.5 seconds is formed from comparator U1, capacitor C4 and resistor R9. Resistor R15 and diode D7 are added to prevent CMOS latchup of the LTC1041 which can happen during discharge of the energy in capacitor C4. The oscillator causes comparator U1 to fully power-up for a very brief period (approximately 80 μsec) every oscillator cycle, make a measurement, change its output state and go back to sleep. The output state is saved by an internal static flip-flop. As a result of the very low duty factor (approx 0.004%) a very small amount of power is used.

Pin 7 of comparator U1 generates a high-going pulse which lasts only as long as comparator U1 is powered up. Comparator U1's pin 7 output pulse is used to synchronize comparator U2's sampling cycle. The pulse is inverted by the circuit composed of resistor R10, FET Q2 and FET Q3. U2's internal oscillator is driven by the inverted version of the pulse from U1 so that it samples at a precisely known point in the overall operating cycle as governed by comparator U1. Capacitor C6, diode D4 and resistor R13 AC couple the pulse into U2's oscillator input which is referenced to ground. Resistor R16 is provided for CMOS latchup protection.

When the voltage at comparator U2 pin 3 exceeds the sum of the inputs at comparator U2 pins 3 and 5, then its output at pin 1 goes low. When the voltage at pin 3 is less than the difference between that at pins 3 and 5, then its output at pin 1 goes high. All input lines must be at the above mentioned conditions at the instant the device samples for the output state to correctly reflect the input conditions. Since this circuit samples only every 2.5 seconds in this particular embodiment, any changes to the voltages between sample times will be ignored until the instant of the next sample time.

A charger module 805 is thus provided which charges the battery cells at a fast charge rate when the correct charger is present as long as the test for the presence of the correct charger is answered in the affirmative. The charger module switches to a slow charge rate when the fast charge mode is exited. Charger module 805 is an example of just one particular charger circuit that can be used to charge cells 501–506. Other charger circuits can be used as well.

While a battery pack apparatus is disclosed in detail above, a method of fabricating the battery pack is also disclosed. This method is now summarized below. More particularly, a method of manufacturing a battery pack from a plurality of flat cells is disclosed which includes the step of mechanically and electrically coupling a plurality of first flat cells to a central connective member having first and second opposed sides. The plurality of first flat cells are situated in side-by-side relationship. Each of the first flat cells include a terminal end facing the first side of the connective member and further include a substantially flat upper and lower surface. The method also includes the step of mechanically and electrically coupling a plurality of second flat cells to the central connective member. The plurality of second flat cells are also situated in side-by-side relationship. Each of the second flat cells includes a terminal end facing the second side of the connective member and further includes a substantially flat upper and lower surface. The disclosed method further includes the step of adhesively coupling an upper plastic connective sheet to the upper surfaces of the plurality of flat first cells. The method also includes the step of adhesively coupling a lower plastic connective sheet to the lower surfaces of the plurality of flat first cells to form a substantially I beam-like battery pack with significant structural integrity.

The foregoing has described a battery pack which exhibits high structural integrity and which includes a housing fabricated of relatively thin electrically insulative plastic material. The battery pack is advantageously relatively light in weight and thin in profile and form factor. The battery pack is desirably adapted for housing thin cells. More particularly, the invention provides a very unique way of maintaining the thin form factor of thin cells.

While only certain preferred features of the invention have been shown by way of illustration, many modifications and changes will occur to those skilled in the art. For example, while in the preferred embodiment, a polycarbonate sheet was employed to fabricate the battery housing, other plastic sheet materials such as polyester, vinyl and ABS (acrylic butyl styrene) may be employed as well. Also, main housing sections with other geometries can also be formed around the I beam-like inner assembly of flat cells and connective sheets since the I beam-like inner battery assembly provides most of the structural integrity of the battery. While a six flat cell illustrative embodiment has been described wherein three flat cells are coupled to each of two opposed sides of a central connective member, it is noted that other embodiments may include a different number of flat cells. For example, two flat cells can be coupled to each of the two opposed sides of the connective member. Also, four or more flat cells can be coupled to each of the two opposed sides of the connective member, provided the number of flat cells does not become so large as to adversely affect the structural integrity of the battery. It is, therefore, to be understood that the present claims are intended to cover all such modifications and changes which fall within the true spirit of the invention.

What is claimed is:

1. A battery pack for a portable electronic apparatus, said battery pack comprising:

a connective member having first and second opposed sides;

a plurality of flat first cells situated in side-by-side relationship, each first cell having a connector end facing the first side of the connective member, each first cell having an upper and lower major surface, the upper surfaces of the first cells being aligned in a common upper plane, the lower surfaces of the first cells being aligned in a common lower plane;

a plurality of flat second cells situated in side-by-side relationship, each second cell having a connector end facing the second side of the connective member, each second cell having an upper and lower major surface, the upper surfaces of the second cells being aligned in the common upper plane, the lower surfaces of the second cells being aligned in the common lower plane;

an upper plastic connective sheet adhesively coupled to the upper surfaces of the flat first cells and the flat second cells; and a lower plastic connective sheet adhesively coupled to the lower surfaces of the flat first cells and the flat second cells thus forming a substantially multi I-beam like structure which provides structural integrity to said battery pack.

2. The battery pack of claim 1 further comprising:

a plastic sheet enclosure surrounding the first cells and the second cells, the plastic sheet enclosure being adhesively coupled to the upper plastic connective sheet and the lower plastic connective sheet.

3. The battery pack of claim 1 wherein each of the plurality of flat first cells is electrically coupled in parallel with a corresponding one of the plurality of flat second cells.

4. The battery pack of claim 1 wherein the connective member includes battery charger circuitry.

5. The battery pack of claim 1 wherein the plurality of flat first cells and the plurality of flat second cells exhibit a predetermined intercell spacing, S.

6. The battery pack of claim 1 wherein the intercell spacing between adjacent flat first cells is within the range of zero to approximately 0.04 inches and the intercell spacing between adjacent flat second cells is within the range of zero to approximately 0.04 inches.

7. The battery pack of claim 1 wherein the intercell spacing between adjacent flat first cells is approximately 0.02 inches and the intercell spacing between adjacent flat second cells is approximately 0.02 inches.

8. The battery pack of claim 1 wherein the plurality of flat first cells includes three flat cells and the plurality of flat second cells includes three flat cells.

9. A method of manufacturing a battery pack from a plurality of flat cells comprising the steps of:

mechanically and electrically coupling a plurality of first flat cells to a central connective member having first and second opposed sides, said plurality of first flat cells being situated in side-by-side relationship, each of the first flat cells including a terminal end facing the first side of the connective member and further including substantially flat upper and lower surface;

mechanically and electrically coupling a plurality of second flat cells to the central connective member, said plurality of second flat cells being situated in side-by-side relationship, each of the second flat cells including a terminal end facing the second side of the connective member and further including substantially flat upper and lower surface;

adhesively coupling an upper plastic connective sheet to the upper surfaces of the plurality of flat first cells; and adhesively coupling a lower plastic connective sheet to the lower surfaces of the plurality of flat first cells to form a substantially I beam-like battery pack.

10. The method of claim 9 further comprising the step of:

attaching a main housing section of plastic sheet material to the battery pack, the main housing section being adhesively coupled to the upper and lower connective sheets.

11. The method of claim 9 further comprising the step of:

substantially surrounding the battery pack with a main housing section of plastic sheet material, the main housing section being adhesively coupled to the upper and lower connective sheets.

* * * * *